United States Patent
Thompson et al.

(10) Patent No.: US 12,195,975 B2
(45) Date of Patent: Jan. 14, 2025

(54) LATERAL ARM AWNING SYSTEM AND METHOD OF OPERATION

(71) Applicant: Carefree/Scott Fetzer Company, Broomfield, CO (US)

(72) Inventors: Scott P. Thompson, Boulder, CO (US); Mark Lyle Goth, Loveland, CO (US)

(73) Assignee: Carefree/Scott Fetzer Company, Bloomfield, CO (US)

( * ) Notice: Subject to any disclaimer, the term of this patent is extended or adjusted under 35 U.S.C. 154(b) by 44 days.

(21) Appl. No.: 17/877,494

(22) Filed: Jul. 29, 2022

(65) Prior Publication Data

US 2022/0381035 A1 Dec. 1, 2022

Related U.S. Application Data

(63) Continuation of application No. 16/538,173, filed on Aug. 12, 2019, now Pat. No. 11,428,011, which is a
(Continued)

(51) Int. Cl.
*E04F 10/06* (2006.01)
*F16F 9/02* (2006.01)

(52) U.S. Cl.
CPC .......... *E04F 10/0611* (2013.01); *E04F 10/06* (2013.01); *E04F 10/0618* (2013.01);
(Continued)

(58) Field of Classification Search
CPC . E04F 10/0637; E04F 10/064; E04F 10/0644; E04F 10/0648; E04F 10/6051;
(Continued)

(56) References Cited

U.S. PATENT DOCUMENTS 1,742,234 A * 1/1930 Clifton ................ E04F 10/0618
160/80
1,814,108 A * 7/1931 Anton ................. E04F 10/0618
248/278.1
(Continued)

FOREIGN PATENT DOCUMENTS

CH 616982 A5 4/1980
DE 2725165 A1 1/1978
(Continued)

OTHER PUBLICATIONS

European Search Report for EP Application Serial No. 141974683 dated Mar. 26, 2018 (7 Pages).
(Continued)

*Primary Examiner* — Johnnie A. Shablack
(74) *Attorney, Agent, or Firm* — Arnold & Porter Kaye Scholer

(57) ABSTRACT

A lateral arm assembly and method of operation includes first and second articulating arms comprising first and second ends, the first ends of the articulating arms are mounted upon assembly to a support surface at separate lateral locations. The first ends each comprise separate pivoting mounting structures for forming a first pivotal connection with the first and second articulating arms. The lateral arm assembly also comprises a roller tube having spaced lateral ends supporting respective end brackets that provide a second pivotal connection to the second ends of the articulating arms. The roller tube supports a canopy coupled to a roller shaft, wherein one of the end brackets further supports a device that drives the roller shaft for furling and unfurling the canopy.

20 Claims, 30 Drawing Sheets

Related U.S. Application Data continuation of application No. 15/287,165, filed on Oct. 6, 2016, now Pat. No. 10,385,574, which is a continuation of application No. 14/565,646, filed on Dec. 10, 2014, now Pat. No. 9,469,997.

(60) Provisional application No. 61/977,055, filed on Apr. 8, 2014, provisional application No. 61/915,408, filed on Dec. 12, 2013.

(52) U.S. Cl.
CPC ...... *E04F 10/0625* (2013.01); *E04F 10/0637* (2013.01); *E04F 10/0648* (2013.01); *E04F 10/0662* (2013.01); *F16F 9/0218* (2013.01)

(58) Field of Classification Search
CPC ... E04F 10/0655; E04F 10/0622; E04F 10/02; E04F 10/06; E04F 10/0611; E04F 10/0614; E04F 10/0618; E04F 10/0625
See application file for complete search history.

(56) References Cited

U.S. PATENT DOCUMENTS

| | | | | |
|---|---|---|---|---|
| 1,993,183 | A * | 3/1935 | Schane | E04F 10/0637 403/111 |
| 2,019,473 | A * | 11/1935 | Anton | E04F 10/0622 248/278.1 |
| 2,038,045 | A * | 4/1936 | Heiser | E04F 10/0618 160/907 |
| 2,299,067 | A * | 10/1942 | Anton | E04F 10/0651 403/120 |
| 3,001,577 | A * | 9/1961 | Anderson | E04F 10/0625 160/67 |
| 3,782,443 | A * | 1/1974 | Clauss | E04F 10/064 135/904 |
| 3,826,271 | A * | 7/1974 | Sattler | B60P 3/343 135/904 |
| 4,214,621 | A * | 7/1980 | Wessels | E04F 10/0633 160/68 |
| 4,302,067 | A * | 11/1981 | Monson | H01R 12/57 439/876 |
| 4,524,791 | A * | 6/1985 | Greer | E04F 10/0651 188/82.2 |
| 4,641,805 | A * | 2/1987 | Martensson, IV | E04F 10/0662 248/223.41 |
| 4,705,148 | A * | 11/1987 | Zindler | E04F 10/0648 160/67 |
| 4,784,204 | A * | 11/1988 | Lohausen | E04F 10/0618 160/22 |
| 4,862,940 | A * | 9/1989 | Atchison | E04F 10/0685 160/67 |
| 5,044,416 | A * | 9/1991 | Murray | B60P 3/343 160/67 |
| 5,148,848 | A * | 9/1992 | Murray | E04F 10/0614 160/67 |
| 5,232,036 | A * | 8/1993 | Brutsaert | E04F 10/0681 160/79 |
| 5,273,095 | A * | 12/1993 | Lukos | E04F 10/0637 160/79 |
| 5,307,856 | A * | 5/1994 | Murray | E04F 10/0688 160/310 |
| 5,365,989 | A * | 11/1994 | Eger | E04F 10/0618 160/22 |
| 5,369,919 | A * | 12/1994 | Lohausen | E04F 10/0692 52/73 |
| 5,752,560 | A * | 5/1998 | Cherng | B60J 1/2055 160/370.22 |
| 5,832,978 | A * | 11/1998 | Kroner | E04F 10/0618 160/79 |
| 5,860,440 | A * | 1/1999 | Murray | B60P 3/343 160/67 |
| 5,896,908 | A * | 4/1999 | Kaun | E04F 10/0614 160/310 |
| 5,921,305 | A * | 7/1999 | Grudl | E06B 9/88 192/46 |
| 6,021,836 | A * | 2/2000 | Schmitz | E04F 10/0611 160/79 |
| 6,032,718 | A * | 3/2000 | Chen | B60J 1/2055 160/370.21 |
| 6,032,909 | A * | 3/2000 | Kroner | E04F 10/0674 248/273 |
| 6,056,350 | A * | 5/2000 | Brutsaert | E04F 10/0662 135/88.11 |
| 6,066,350 | A * | 5/2000 | Purtle | C11B 1/10 426/489 |
| 6,098,693 | A * | 8/2000 | Frey, Jr. | E04F 10/0648 160/67 |
| 6,125,905 | A * | 10/2000 | Woodside | E04F 10/0625 160/67 |
| 6,189,948 | B1 * | 2/2001 | Lin | B60J 1/2019 160/310 |
| 6,191,886 | B1 * | 2/2001 | Sinkoff | G03B 21/58 359/461 |
| 6,273,172 | B1 * | 8/2001 | Frey | E06B 9/72 160/67 |
| 6,276,424 | B1 * | 8/2001 | Frey, Jr. | E06B 9/72 160/67 |
| 6,341,638 | B1 * | 1/2002 | Thompson | E04F 10/08 160/67 |
| 6,363,664 | B1 * | 4/2002 | Brutsaert | E04F 10/0618 52/63 |
| 6,457,508 | B1 * | 10/2002 | Tomita | E06B 9/40 160/67 |
| 6,488,069 | B1 * | 12/2002 | Mashaw | E04F 10/0681 160/63 |
| 6,557,612 | B2 * | 5/2003 | Voss | E04F 10/0651 160/79 |
| 6,581,664 | B2 * | 6/2003 | Kroner | E04F 10/0618 192/69.7 |
| 6,622,742 | B1 * | 9/2003 | Hanna | E04F 10/0625 160/67 |
| 6,763,874 | B1 * | 7/2004 | Chen | B60J 1/2055 160/79 |
| 6,782,936 | B1 * | 8/2004 | Girard | E04F 10/0648 160/67 |
| 6,820,673 | B2 * | 11/2004 | Wessels | E04F 10/0611 160/56 |
| 6,843,301 | B2 * | 1/2005 | Carrillo | E04F 10/0625 160/310 |
| 6,874,558 | B2 * | 4/2005 | Mester | E04F 10/0637 160/22 |
| 6,957,679 | B2 * | 10/2005 | Powell | E04F 10/06 160/64 |
| 6,971,433 | B2 * | 12/2005 | Wagner | E04F 10/0614 160/67 |
| 7,017,976 | B1 * | 3/2006 | Rutherford | B60P 3/343 160/79 |
| 7,077,458 | B2 * | 7/2006 | Malott | E04F 10/0662 296/171 |
| 7,117,565 | B2 * | 10/2006 | Brutsaert | E04F 10/0618 16/386 |
| 7,152,652 | B2 * | 12/2006 | Heitel | E04F 10/0659 160/310 |
| 7,163,042 | B2 * | 1/2007 | Li | E04F 10/0674 160/22 |
| 7,188,889 | B2 * | 3/2007 | Wagner | B60P 3/343 135/88.11 |
| 7,261,115 | B2 * | 8/2007 | Weddell | B60P 3/343 160/122 |
| 7,344,182 | B1 * | 3/2008 | Weddell | E04F 10/0633 160/67 |
| 7,367,376 | B2 * | 5/2008 | Llagostera Forns | E04F 10/0651 160/79 |
| 7,451,797 | B2 * | 11/2008 | Llagostera Forns | E04F 10/0622 160/79 |

(56) References Cited

U.S. PATENT DOCUMENTS

| | | | | |
|---|---|---|---|---|
| 7,604,036 | B2* | 10/2009 | Thompson | E04F 10/0625 160/67 |
| D604,427 | S* | 11/2009 | Kramer | D25/57 |
| 7,628,194 | B2* | 12/2009 | Wagner | E04F 10/0622 160/79 |
| 7,645,088 | B2* | 1/2010 | Voss | E04F 10/0618 160/78 |
| 7,740,044 | B2* | 6/2010 | Gutierrez | E04F 10/0625 160/67 |
| 7,967,050 | B2* | 6/2011 | Gutierrez | E04F 10/0603 160/67 |
| 8,042,595 | B2* | 10/2011 | Llagostera Forns | E04F 10/0688 160/22 |
| 8,042,596 | B2* | 10/2011 | Llagostera Forns | E04F 10/0651 160/79 |
| 8,113,259 | B2* | 2/2012 | Tessmer | E04F 10/0618 40/604 |
| 8,113,260 | B2* | 2/2012 | Llagostera Forns | E04F 10/0622 160/79 |
| 8,179,062 | B2* | 5/2012 | Germain | E05F 15/40 318/560 |
| 8,256,486 | B1* | 9/2012 | Thomas | E04F 10/067 160/44 |
| D669,193 | S* | 10/2012 | Kramer | D25/57 |
| 8,316,910 | B2* | 11/2012 | Popa | E04F 10/0622 160/46 |
| 8,726,967 | B2* | 5/2014 | Llagostera Forns | E04F 10/0618 160/79 |
| 8,752,606 | B2* | 6/2014 | Albrecht | E06B 9/70 160/67 |
| 8,839,839 | B2* | 9/2014 | Prine, Sr. | E04F 10/0618 160/56 |
| 8,887,785 | B2* | 11/2014 | Goth | G05B 19/0428 160/7 |
| 8,960,256 | B2* | 2/2015 | Wagner | E04F 10/0648 160/70 |
| 9,175,481 | B2* | 11/2015 | Albrecht | E04F 10/0625 |
| 9,410,326 | B2* | 8/2016 | Albrecht | E04F 10/0614 |
| 9,469,996 | B2* | 10/2016 | Ma | E04F 10/0618 |
| 9,469,997 | B2* | 10/2016 | Thompson | E04F 10/06 |
| 9,834,952 | B1* | 12/2017 | Meyers | E04F 10/0614 |
| D814,047 | S* | 3/2018 | Pozzi | D25/57 |
| 10,066,414 | B2* | 9/2018 | Ma | E04F 10/0618 |
| D848,640 | S* | 5/2019 | Meyers | D25/57 |
| 10,316,522 | B2* | 6/2019 | Thompson | E04F 10/0625 |
| 10,385,574 | B2* | 8/2019 | Thompson | E04F 10/0662 |
| 10,428,549 | B2* | 10/2019 | Ma | E04F 10/0622 |
| 10,560,050 | B2* | 2/2020 | Raghunathan | H02S 30/20 |
| D896,990 | S* | 9/2020 | Browaeys | D25/57 |
| 10,947,736 | B2* | 3/2021 | Thompson | E06B 9/68 |
| 10,954,689 | B2* | 3/2021 | Ma | E04F 10/0622 |
| 11,021,878 | B2* | 6/2021 | Coucke | E04F 10/0625 |
| 11,428,011 | B2* | 8/2022 | Thompson | E04F 10/0637 |
| 11,613,894 | B2* | 3/2023 | Ma | E04F 10/0648 160/52 |
| 2002/0062851 | A1* | 5/2002 | Thompson | E04F 10/0614 135/88.12 |
| 2003/0094833 | A1* | 5/2003 | Thompson | E04H 15/08 296/173 |
| 2004/0221965 | A1 | 11/2004 | Wagner | |
| 2005/0072532 | A1* | 4/2005 | Holden | E06B 9/72 160/66 |
| 2007/0240832 | A1* | 10/2007 | Cavarec | E04F 10/0651 160/70 |
| 2009/0050277 | A1* | 2/2009 | Ito | E04F 10/0618 160/67 |
| 2009/0301664 | A1 | 12/2009 | Foms | |
| 2010/0024991 | A1* | 2/2010 | Thompson | B60P 3/343 160/67 |
| 2010/0126544 | A1 | 5/2010 | Wagner | |
| 2011/0304823 | A1* | 12/2011 | Wensing | E04F 10/0692 353/15 |
| 2013/0126103 | A1 | 5/2013 | Thomas | |
| 2013/0126104 | A1* | 5/2013 | Weber | E04F 10/0618 160/79 |
| 2014/0251552 | A1 | 9/2014 | Ma | |
| 2015/0167308 | A1* | 6/2015 | Thompson | E04F 10/0648 160/67 |
| 2015/0176285 | A1 | 6/2015 | Albrecht | |
| 2017/0022716 | A1* | 1/2017 | Thompson | E04F 10/0662 |
| 2017/0275884 | A1 | 9/2017 | Thompson | |
| 2019/0177980 | A1* | 6/2019 | Ma | E04F 10/064 |
| 2019/0301166 | A1* | 10/2019 | Thompson | E04F 10/0651 |
| 2019/0368201 | A1* | 12/2019 | Thompson | E04F 10/06 |
| 2022/0381035 | A1* | 12/2022 | Thompson | E04F 10/0625 |

FOREIGN PATENT DOCUMENTS

| | | |
|---|---|---|
| DE | 2640796 A1 | 3/1978 |
| DE | 19604535 A1 | 8/1997 |
| DE | 69510399 T2 | 12/1999 |
| DE | 10231501 A1 | 1/2004 |
| DE | 102005040756 A1 | 3/2007 |
| DE | 102010033275 A1 | 1/2012 |
| DE | 2013103994 U1 | 12/2013 |
| EP | 0119550 A2 | 9/1984 |
| EP | 125727 A1 | 11/1984 |
| EP | 628677 A1 | 12/1984 |
| EP | 0489186 A1 | 6/1992 |
| EP | 0676514 A1 | 11/1995 |
| EP | 1267011 A1 | 12/2002 |
| EP | 1767722 A2 | 3/2007 |
| EP | 1767722 A3 | 5/2011 |
| EP | 2845962 A1 | 3/2015 |
| EP | 3073024 A1 | 9/2016 |
| FR | 2738582 A1 | 3/1997 |
| FR | 2782103 A1 | 2/2000 |
| FR | 2794781 A1 | 12/2000 |
| FR | 2967450 A1 | 5/2012 |
| FR | 2989399 A1 | 10/2013 |
| JP | 6165132 | 5/1986 |
| JP | 2000064544 A | 2/2000 |
| JP | 2001081922 A | 3/2001 |
| WO | WO 2011/008177 A1 | 1/2011 |
| WO | WO 2011/013150 A2 | 2/2011 |

OTHER PUBLICATIONS

European Search Report dated Feb. 2, 2016 (10 Pages).
Machine English Translation for JP 61/65132 dated May 2, 1986 (4 pages).

* cited by examiner

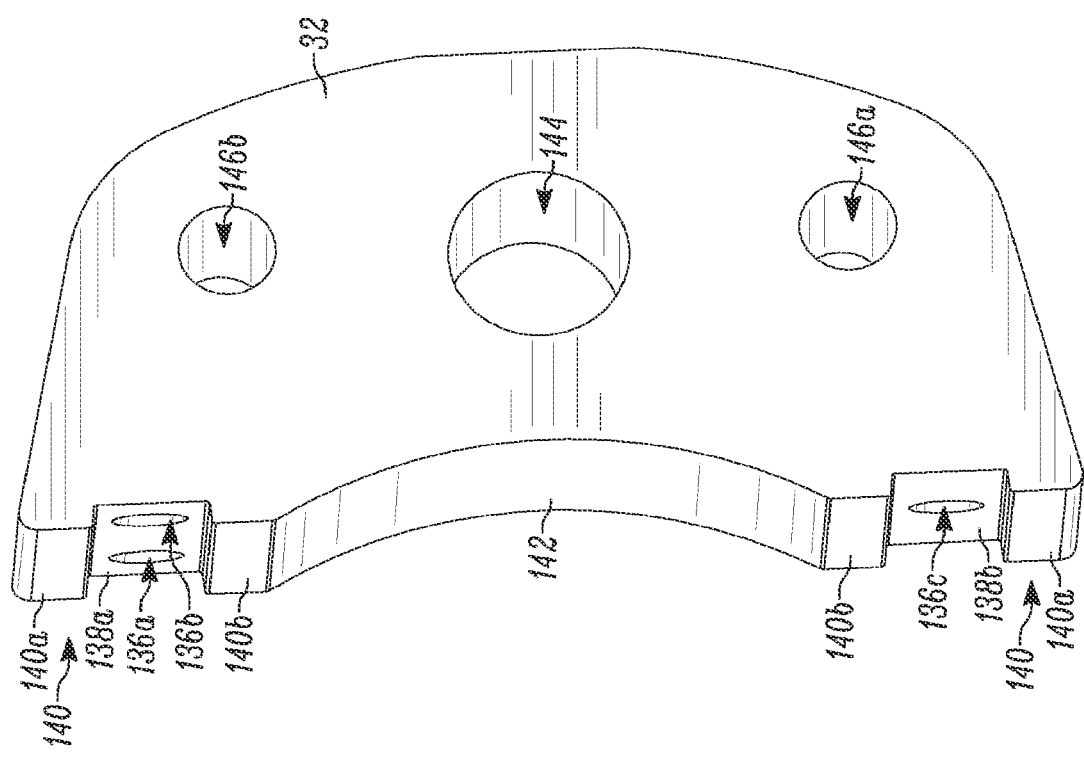

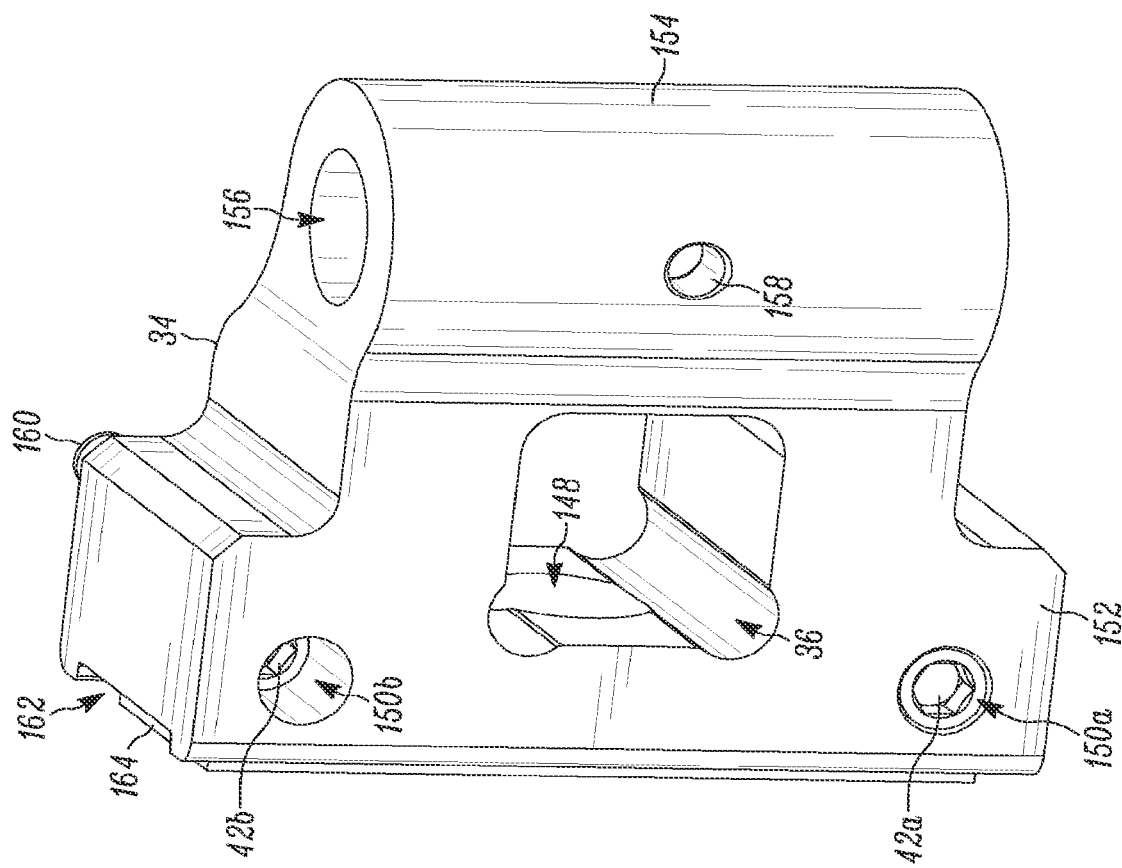

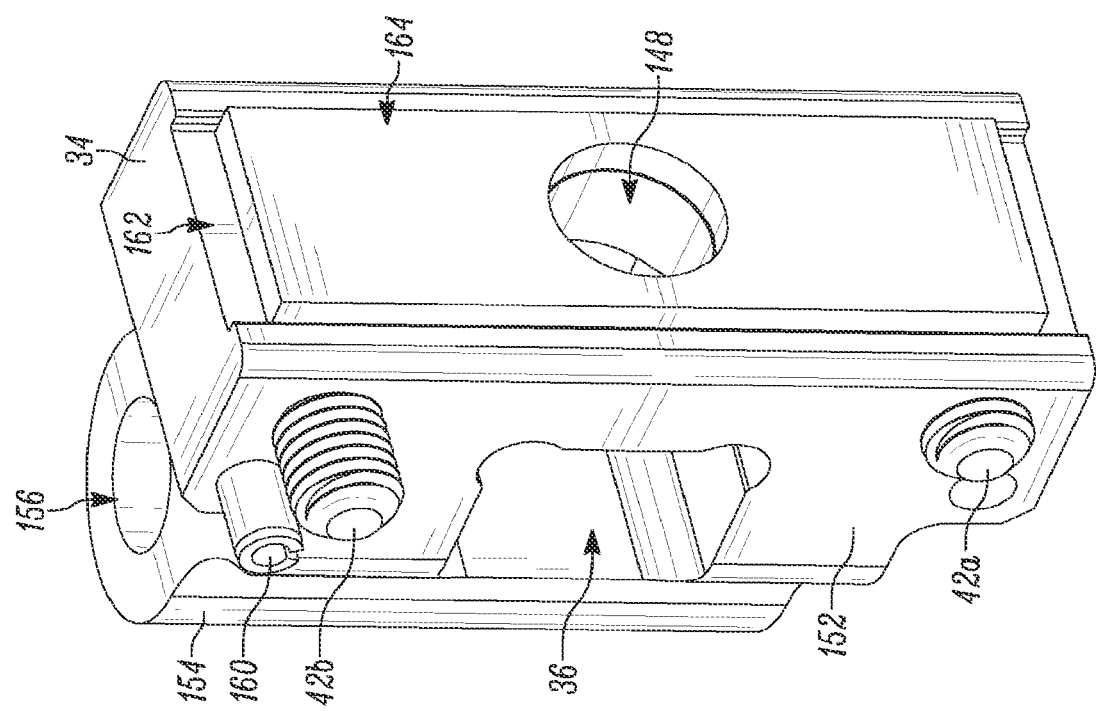

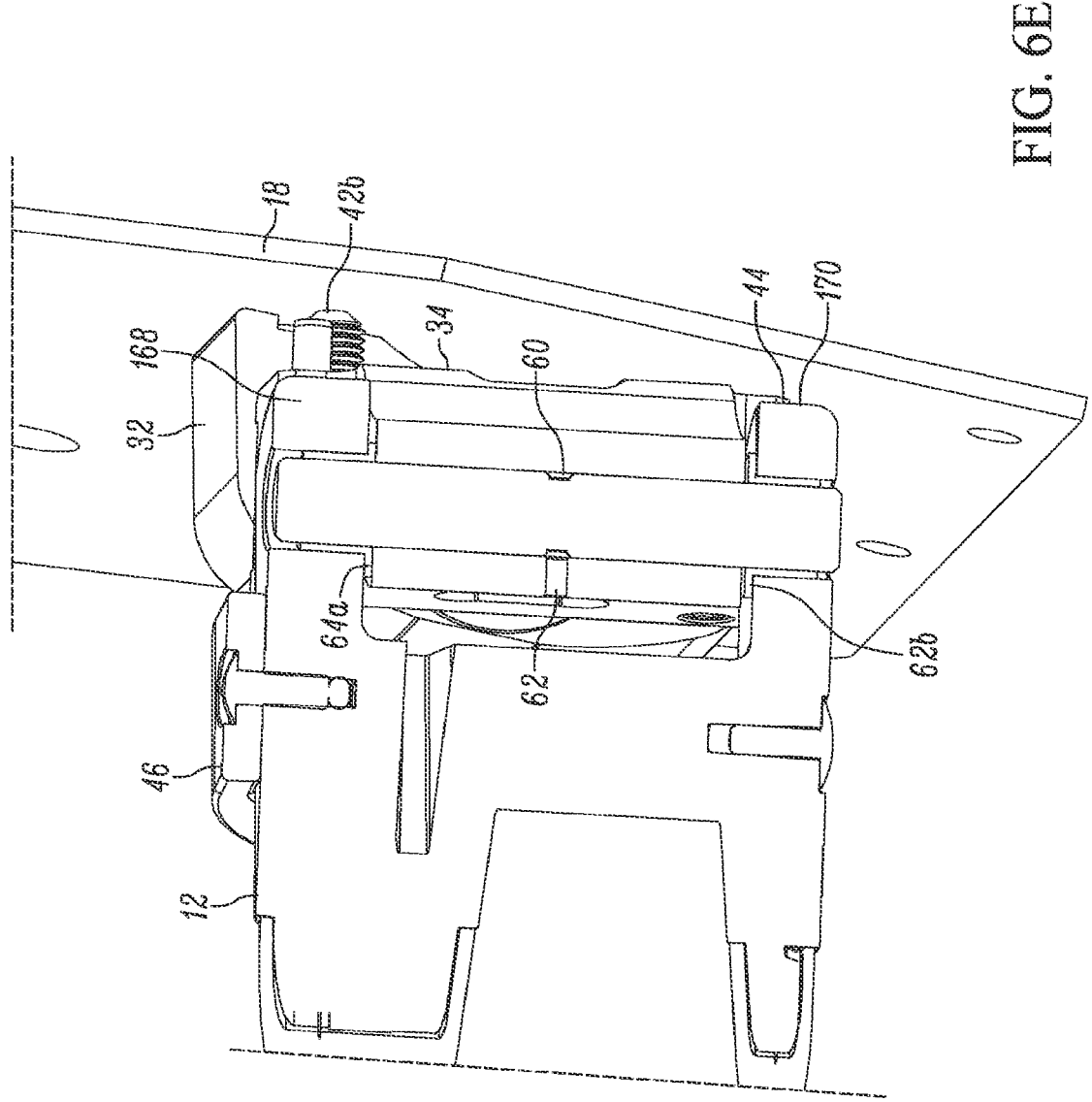

LATERAL ARM AWNING SYSTEM AND METHOD OF OPERATION

CROSS REFERENCE TO RELATED APPLICATIONS

The following application is a continuation application claiming priority under 35 U.S.C. § 120 to U.S. non-provisional application Ser. No. 16/538,173 that was filed on Jul. 12, 2019, published on Dec. 5, 2019 under publication number US 2019-0368201 entitled LATERAL ARM AWNING SYSTEM AND METHOD OF OPERATION which claims priority under 35 U.S.C. § 120 to co-pending U.S. non-provisional application Ser. No. 15/287,165 that was filed on Oct. 6, 2016, published on Jan. 26, 2017 under publication number US 2017-0022716, and issued as U.S. Pat. No. 10,385,574 on Jul. 20, 2019 entitled LATERAL ARM AWNING SYSTEM AND METHOD OF OPERATION, which claims priority under 35 U.S.C. § 120 to U.S. non-provisional application Ser. No. 14/565,646 that was filed on Dec. 10, 2014, published on Jun. 18, 2015 under publication number US-2015-0167308, and issued as U.S. Pat. No. 9,469,997 on Oct. 18, 2016 entitled LATERAL ARM AWNING SYSTEM AND METHOD OF OPERATION, which claims priority under 35 U.S.C. 119(e) to U.S. Provisional Patent Application Ser. No. 61/977,055 filed Apr. 8, 2014 entitled LATERAL ARM AWNING WITH LEAD RAIL ROLLER AND MOTOR and U.S. Provisional Patent Application Ser. No. 61/915,408 filed Dec. 12, 2013 entitled LATERAL ARM AWNING WITH LEAD RAIL ROLLER AND MOTOR. The above-identified applications, patent, and published application all of which priority is claimed are all incorporated herein by reference in their entirety for all purposes.

TECHNICAL FIELD

The present disclosure relates to a design and method of operation of a retractable roll-up awning, and more specifically, a lateral arm awning system.

BACKGROUND

Many retractable awning systems, for example, as mounted on the sides of motor homes or over patios or windows, have a fabric canopy that is typically rolled or furled around a roller tube when not in use. The awnings have retraction systems that are actuated by a motor, a spring, or a manually operated gearbox to retract the awning. The roller tube may be connected to extension arms (or other extension structures) to extend and contract the arms while the roller tube is rotated by systems mentioned. The motor, spring, or manually operated gearbox is typically connected to the roller tube to rotate it in clockwise and/or counter-clockwise directions, thus operating to furl or unfurl the canopy around or from the roller tube.

There are typically two types of awning configurations: vertical arm awnings and lateral arm awnings. In vertical arm awning implementations, one edge of the canopy may be affixed to the wall of the motor home along a rail or within a storage box. A first end of each vertical arm is attached to a respective lateral end of the roller tube such that the roller tube can rotate with respect to the vertical arm. In some designs, the roller tube may be mounted within a roller housing that provides additional lateral structure rather than placing all the tension and compression forces on the roller tube. The opposite end of each vertical arm is mounted to the wall of the motor home, toward the base of the wall several feet underneath and just outside the lateral ends of the rail (or under the lateral ends of the storage box). When the awning is fully extended, the vertical arms extend at an angle upward and outward from the wall of the motor home to support the roller tube. The motor that drives the roller tube may be mounted to the first end of one of the vertical arms to interface with the spindle of the roller tube. This configuration of the motor is possible because the vertical arms act like struts with a vertical fence resistance component that can support the significant weight of the motor and roller tube. One problem with this configuration is that the extended vertical arms interfere with users who must negotiate around the arms to enter under the awning from the sides. Another problem with this configuration is that there must be two unobstructed vertical spaces on the wall of the motor home for the vertical arms to mount to and collapse against when the awning is stowed. This may limit the size of an available awning or limit the position of the awning on the side of the motor home to locations between windows or other obstructions.

Lateral arm awnings do not use vertical arm supports on the lateral ends of the awning. Instead, the lateral arms articulate from a folded position against the sidewall of the motor home to an extended position in the same plane that supports the extended canopy. However, the lateral arms are unable to support the weight of the roller tube and motor. Therefore, the roller tube and motor are mounted against the wall of the motor home, typically within a box or other housing. A lead rail is mounted to the distal ends of each of the lateral arms and a leading edge of the canopy is attached along the length of the lead rail. The lead rail is typically lightweight and does not need to resist significant tension or compression due to a vertical load because the edge of the canopy is lightweight. The lateral arms do exert a lateral tensile force on the lead rail which is more easily born. The benefit of lateral arm canopies is the unobstructed space under the awning as there are no vertical arms on each side. Further, installation is not impeded by structures on the sidewall of the motor home because the awning can be installed well above any windows or other structures. However, the box or housing and the lead rail translate into additional material and manufacturing costs not necessarily needed with a vertical arm awning.

The information included in this Background section of the specification, including any references cited herein and any description or discussion thereof, is included for technical reference purposes only and is not to be regarded subject matter by which the scope of the invention is to be bound.

SUMMARY

One example embodiment of the present disclosure comprises a lateral arm assembly having first and second articulating arms comprising first and second ends, the first ends of the articulating arms are mounted upon assembly to a support surface at separate lateral locations. The first ends each comprise separate pivoting mounting structures for forming a first pivotal connection with the first and second articulating arms. The lateral arm assembly also comprises a roller tube having spaced lateral ends supporting respective end brackets that provide a second pivotal connection to the second ends of the articulating arms. The roller tube supports a canopy coupled to a roller shaft, wherein one of the end brackets further supports a device that drives the roller shaft for and unfurling the canopy.

Another example embodiment of the present disclosure comprises a method of operating a lateral arm awning assembly. The method comprises the steps of mounting to a support surface first ends of first and second articulating arms at separate lateral locations and providing separate pivoting mounting structures to the first ends of the first and second articulating arms. The pivoting mounting structures forming a first pivotal connection with the first and second articulating arms and the support surface. The method also comprises providing a roller tube having spaced lateral ends supporting respective end brackets, the end brackets providing a second pivotal connection to second ends of the first and second articulating arms and supporting a canopy with the roller tube and coupling the canopy to a roller shaft. The method further includes driving the roller shaft to furl and unfurl the canopy with a device that is supported by one of the end brackets.

Yet another example embodiment of the present disclosure includes a lateral arm awning assembly comprising first and second articulating arms having first and second ends, the first ends of the articulating arms being mounted upon assembly to a support surface at separate lateral locations. The first ends each comprise separate pivoting mounting structures for forming a pivotally fixedly connection with the first and second articulating arms. The assembly also comprises a roller tube having spaced lateral ends supporting respective end brackets that provide a pivotally fixedly connection to the second ends of the first and second articulating arms. The roller tube supports a canopy coupled to a roller shaft, wherein one of the end brackets further supports a drive motor that drives the roller shaft for furling and unfurling the canopy. The canopy when in an unfurled position forms a plane such that the first and second articulating arms are disposed to remain substantially parallel with the plane during the operation of the awning assembly as the canopy extends from a furled to an unfurled position

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which:

FIG. 6A is a rear left isometric view of a mount block used to mount the lateral arm awning of FIG. 1 to the mount plate;

FIG. 6B is a top front isometric view of a pivot block that fixedly attaches to the mount block and pivotably attaches to a clevis extending from an arm of the lateral arm awning of FIG. 1;

FIG. 6C is a left rear isometric view of the pivot block of FIG. 6B;

FIG. 6E is a right side isometric view in cross section of a portion of the pivot attachment of an extension arm of the lateral arm awning of FIG. 1 at the mounting plate;

Figure 1:
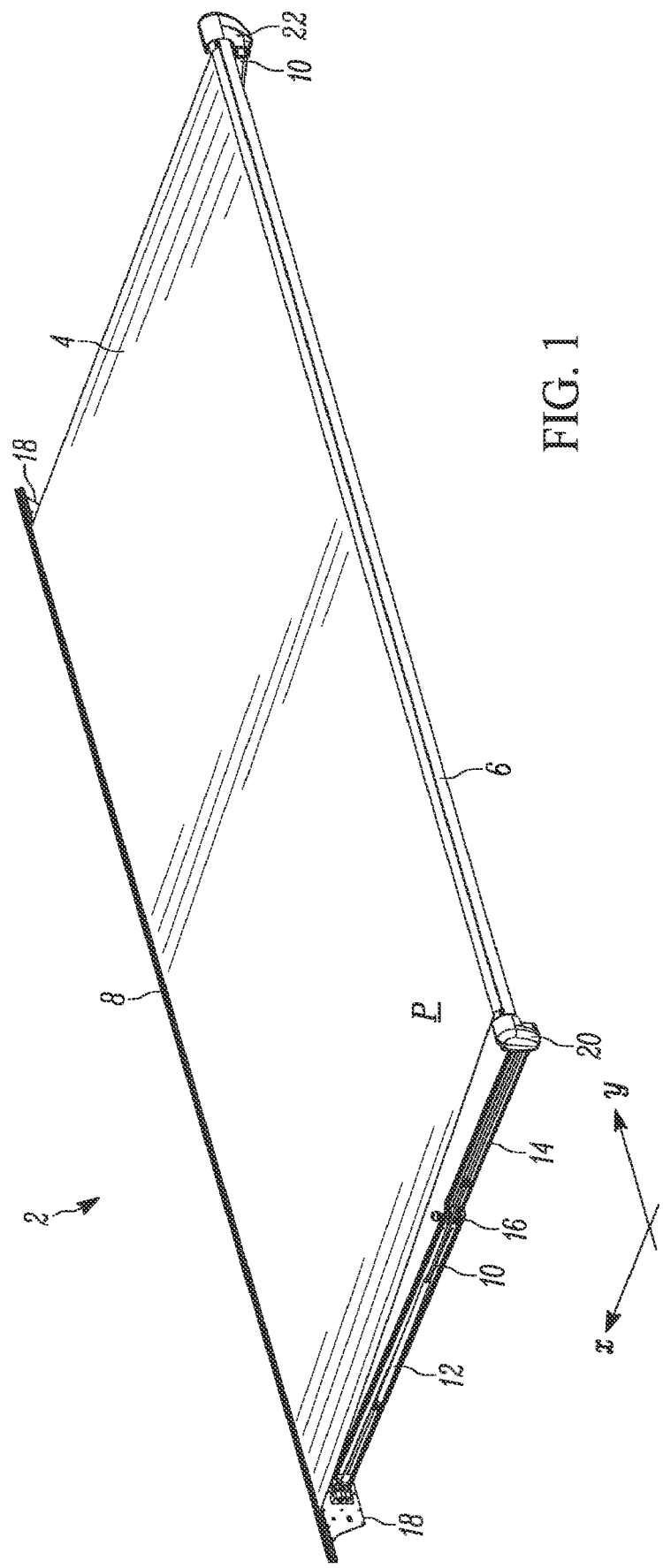
FIG. 1 is an isometric view of a lateral arm awning in an extended position with the roller tube and motor mounted between the distal ends of the extended arms.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure relates to a design and method of operation of a retractable roll-up awning, and more specifically, a lateral arm awning system.

Figure 2:
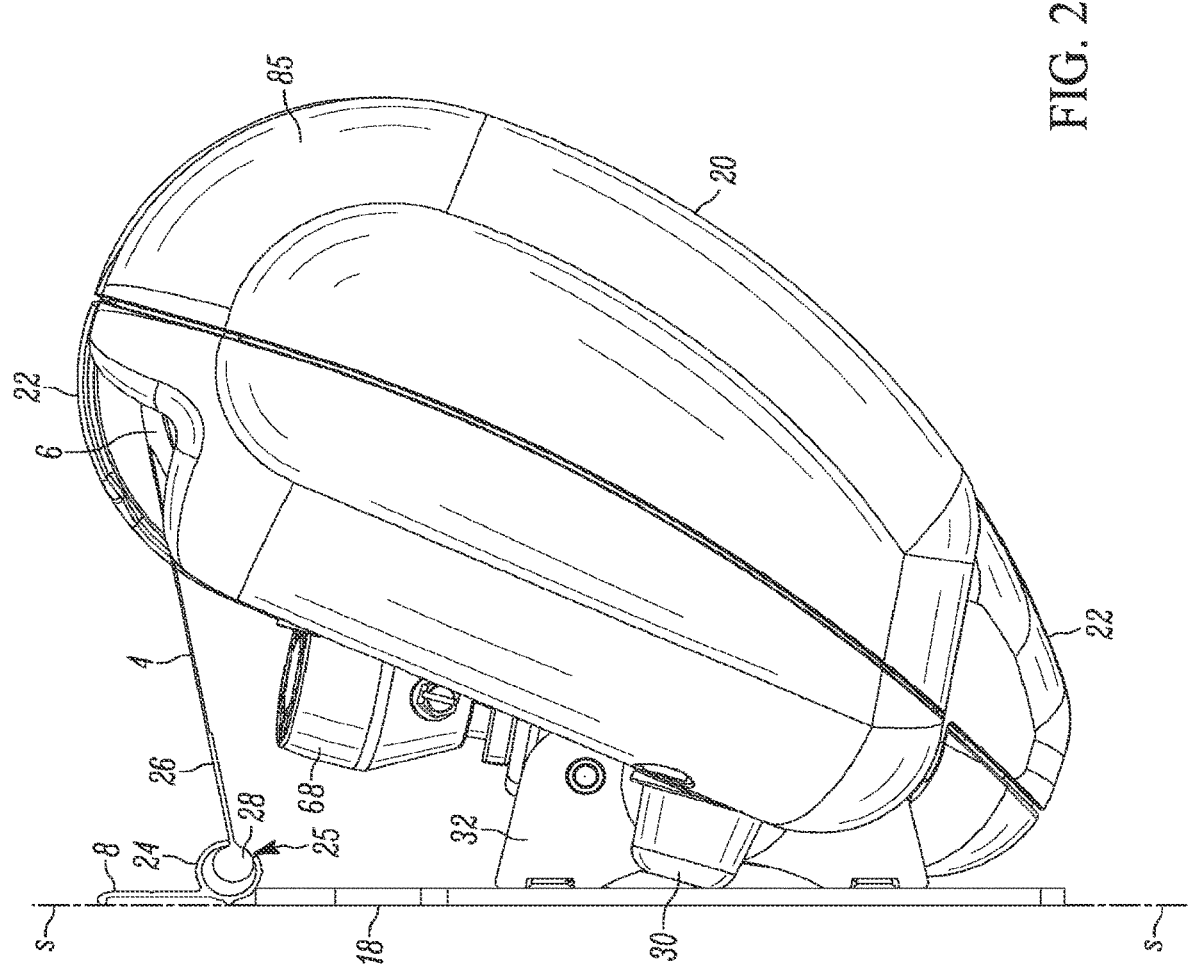
FIG. 2 is a left side elevation view of the lateral arm awning of FIG. 1 in a closed position.

One exemplary implementation of a lateral arm awning 2 is depicted in full in FIGS. 1 and 2. The lateral arm awning assembly 2 is shown fully extended in FIG. 1 and fully retracted in FIG. 2. The primary components of the lateral arm awning 2 as shown in FIG. 1 are a canopy 4, a roller tube 6, a canopy rail 8, and lateral extension arms 10. Each of the lateral extension arms 10 may be composed of two sections, a proximal arm 12 and a distal arm 14 joined together at an arm elbow 16. A left roller cap 20 and a right roller cap 22 provide a link between the lateral ends of the roller 6 and the distal ends of the respective lateral extension arms 10. When the canopy is in the extended position, it forms a plane P along an x axis and a y axis as illustrated in FIG. 1. The plane P is framed by the lateral arms 12, 14 about the sides and roller 6 and canopy rail 8 about its ends.

A pair of mounting plates 18 are connected, respectively, to the proximal ends of the extension arms 10 to support the awning 2 against a sidewall of a motor home, house, or other structure. The canopy rail 8 is likewise configured for attachment to the sidewall of a motor home, house, or other structure immediately above the mounting brackets 18. The canopy rail 18 may extend the width of the canopy 4 or may be longer (or possibly shorter, although this is not preferred).

As shown in FIG. 2, the proximal end of the canopy 2 may be connected to an attachment tab 26 that runs the width of the canopy 2. The attachment tab 26 may be fixed to the proximal edge of the canopy 2 with adhesive, stitching, overmolding (if formed of a plastic material, or a combination of any of these or other known methods of attachment). The proximal edge of the attachment tab may be formed as a retention rod 28 that extends the width of the canopy 2. The attachment tab 26 with retention rod 28, and similarly the canopy rail 8, may be formed monolithically as a plastic extrusion, a molded plastic piece, or of an extruded, lightweight metal (e.g., aluminum). The lower edge of the canopy rail 8 is formed as a tube 24 that also extends the width of the canopy 2. The rail tube 24 further defines a linear slot 25 along the length of the rail tube 24. The retention rod 28 may be cylindrical as shown or may have any other cross section that can fit within and be retained within the rail tube 24 and allow the canopy 4 to extend from the linear slot 25. The rail tube 24 may similarly have any cross-sectional form as long as the retention rod 28 can fit therein.

The following discussion of the components and construction of the awning 2 focuses on the construction of a single arm 10 and the connections between the arm 10 and a wall or other surface at a first end and to the roller tube 6 at a second end. However, there are two arms 10 supporting the canopy 4 of the awning 2 mounted at two separate, respective locations on the support surface and connected to respective lateral ends of the roller tube 6. Therefore, it should be apparent that when one structure of the arm 10 or a mounting or connection structure attached thereto is described, the same structure is found in the construction of both arms unless otherwise stated. The primary difference is that the parts may either be flipped in orientation or manufactured to be of a symmetric form to the parts on the opposing arm 10.

Figure 3:
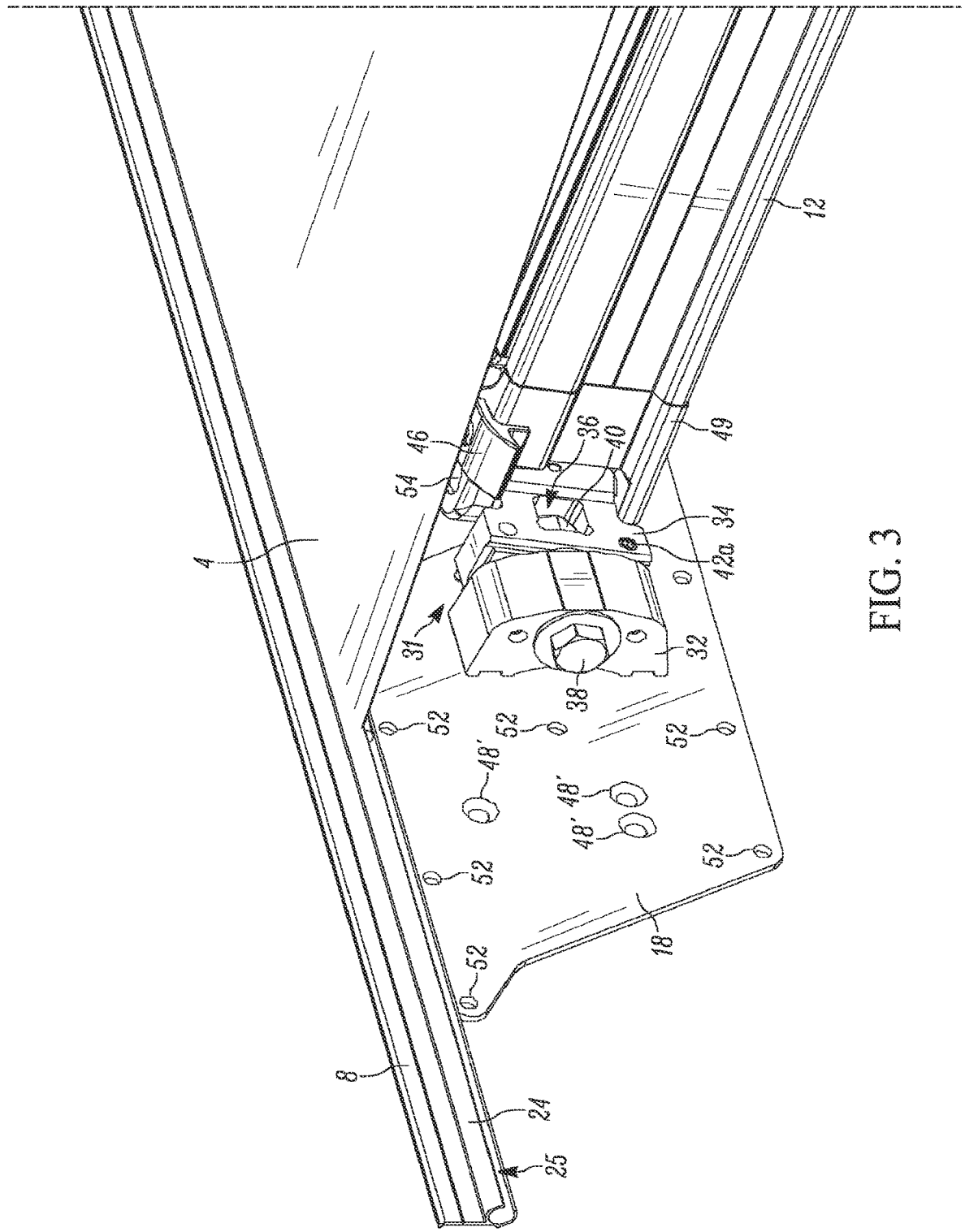
FIG. 3 is a front left isometric view of a portion of the lateral arm awning of FIG. 1.
Figure 4:
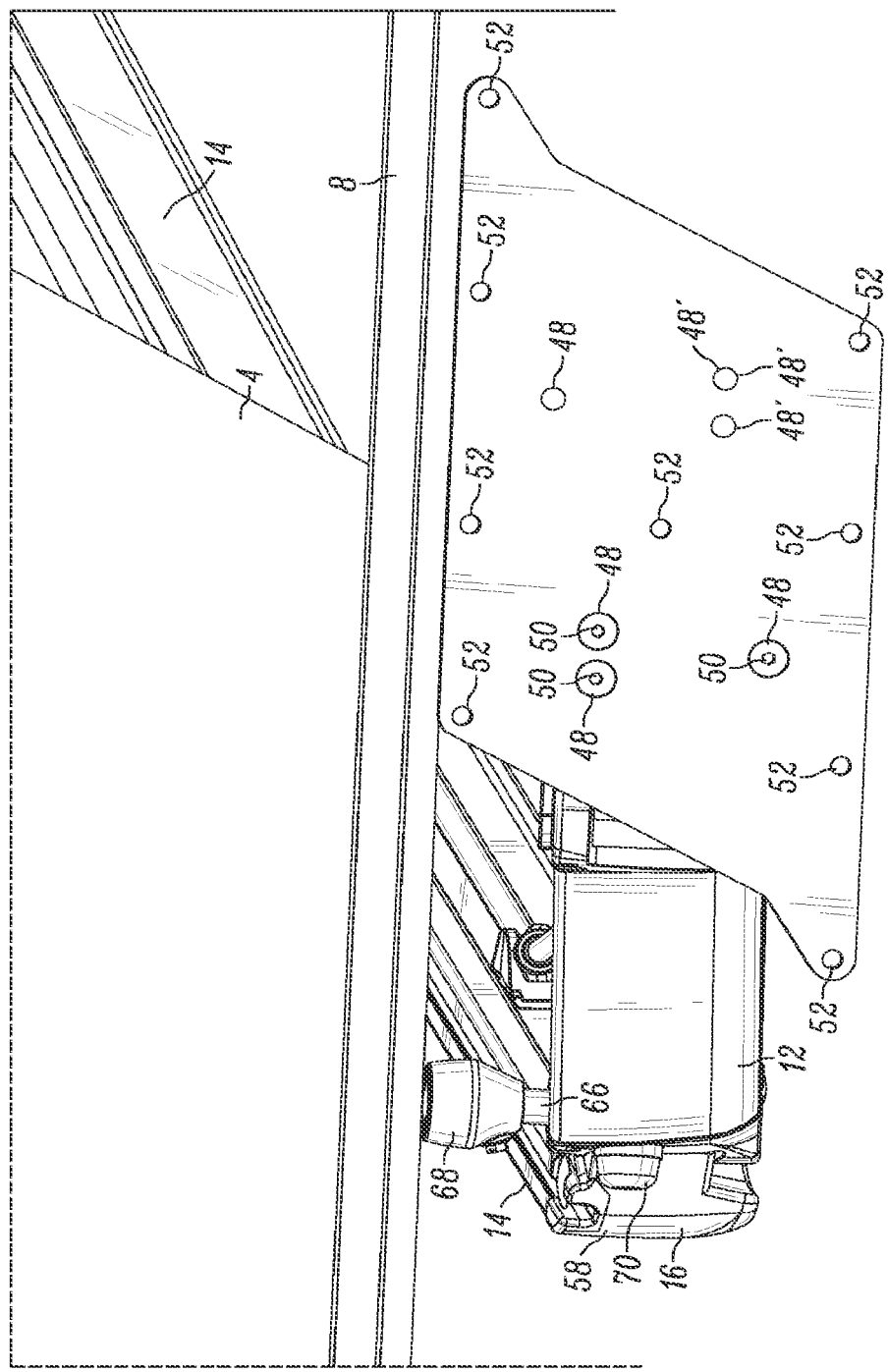
FIG. 4 is left rear isometric view of a portion of the lateral arm awning of FIG. 1.
Figure 5:
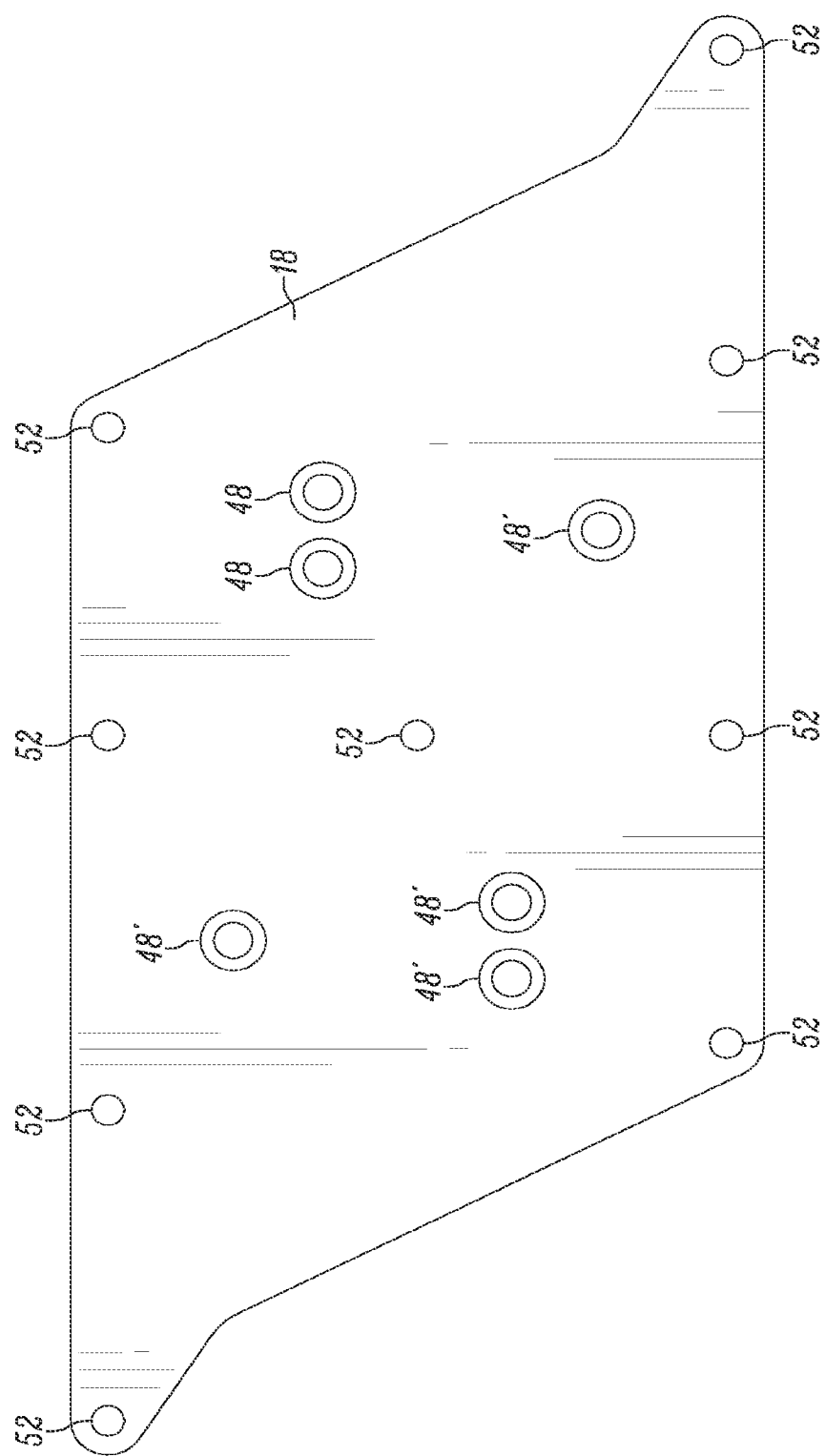
FIG. 5 is front elevation view of a mounting plate used to mount the lateral arm awning of FIG. 1 to a surface.

As shown particularly in FIGS. 3-5, each of the mounting plates 18 may be formed of a sheet of steel sufficiently thick (e.g., one-tenth of one inch (0.1") to one-quarter of one inch (0.25")) to structurally support the weight of the awning 2, both when stowed and extended, and further to support the awning 2 when additional forces act upon the awning 2, for example, wind gusts or rain or snow load. As shown in the figures, the mounting plate 18 may be formed in the shape of a parallelogram with additional tabs extending from the two upper and lower corners of the furthest lateral extension of the parallelogram. The shape of the mounting plate 18 may be varied depending upon various factors including, for example, the projected load; the available size, shape, or form of the surface area for attachment on the wall; or others. A number of mounting holes 52 may be formed throughout the mounting plate 1 for use with lag bolts or other bolts to attach the mounting plate 18 to the wall. In the exemplary embodiment shown, there are four mounting holes 52 spaced evenly apart along each of the top and bottom edges of the mounting plate 18 with four of the mounting holes 52 located in the respective corners of the mounting plate 18. Additional mounting holes 52 may be formed in other locations within the mounting plate 18 and other arrangements of mounting holes 52 are possible.

A number of block screw apertures 48, 48' may be formed in the mounting plate 18. In the embodiment shown, the block screw apertures 48, 48' area arranged in two sets of three in triangular patterns. It may be noted that the mounting plate 18 is designed to be reversible such that the same form of the mounting plate can be used on each side of the awning 2 in a reverse orientation. The block screw apertures 48, 48' may be conically beveled with the bevels of one set of block screw apertures 48 formed on a first side of the mounting plate 18 and the other set of block screw apertures 48' formed on the opposite side of the mounting plate 18. The block screw apertures 48, 48' may be beveled to accept bevel-headed screws used to attach the extension arms 10 to the mounting plate 18 such that the heads of the screws are flush with the back surface of the mounting plate 18 when it is placed against a wall.

Figure 6D:
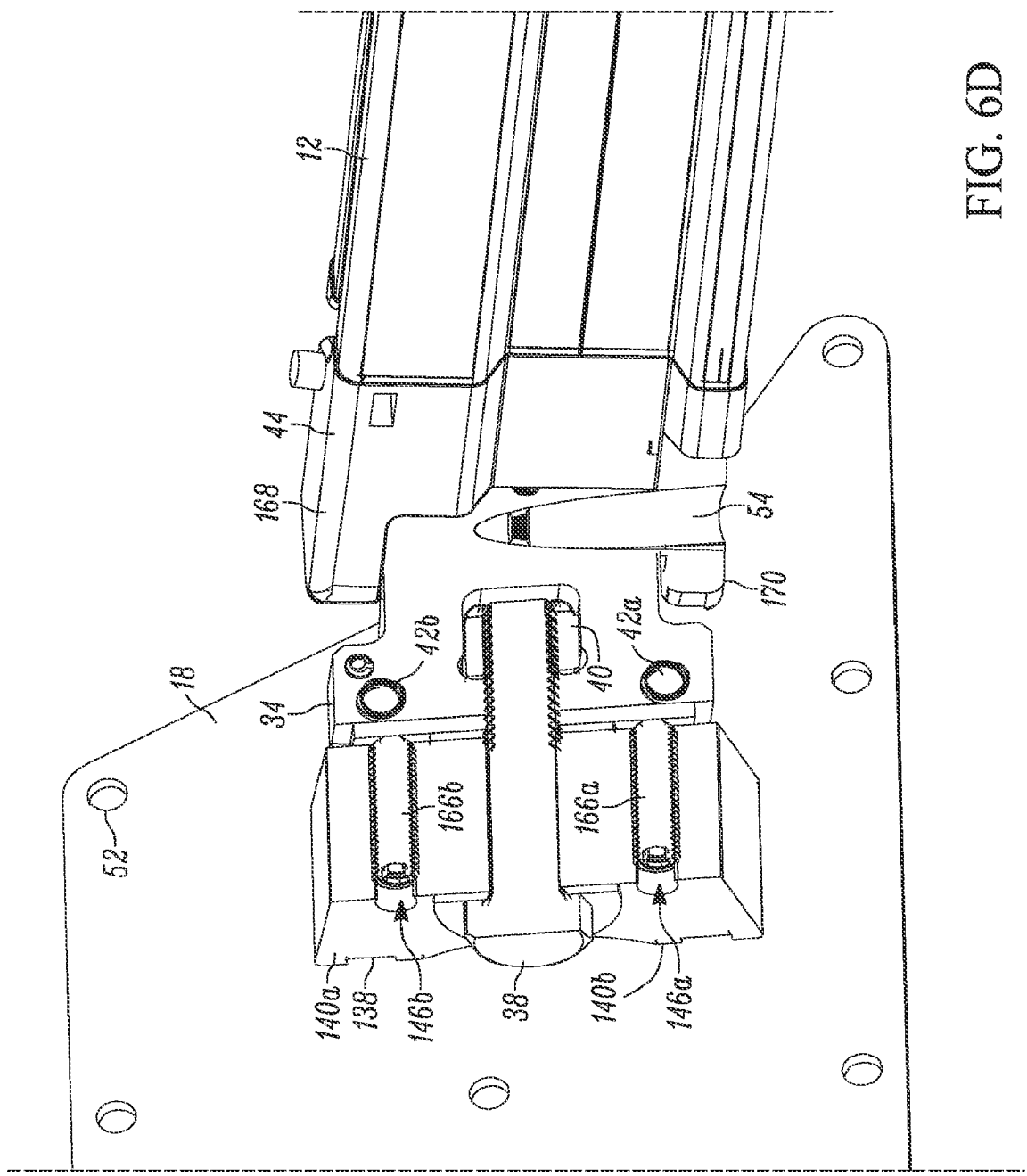
FIG. 6D is a front isometric view in cross section of a portion of the pivot attachment of an extension arm of the lateral arm awning of FIG. 1 at the mounting plate.

As shown in greater detail in FIGS. 3, 6A-6E, and 7, the extension arms 10 are attached to the mounting plates 18 via a pivoting mounting hinge structure 31 composed primarily of a mount block 32, a pivot block 34, and an arm clevis 44. It may be appreciated that both the mount block 32 and pivot block 34 are designed such that they can be used on either side of the awning 2 merely by flipping the orientation of the components 180 degrees. As shown in FIG. 6A, the mount block 32 is formed from a solid block of rigid material (e.g., aluminum) and machined to define a number of features. The back surface may be formed as an arcuate bridge 142 terminating at each end in at a foot 140 that interfaces with the mounting plate 18. Each foot 140 may be define a recessed channel 138a/b such that an outer foot 140a and an inner foot 140b bound each channel 138a/b. Three threaded blind holes 136a/b/c may be formed with in the channels 138a/b, two in an upper channel 138a and one in a lower channel 138b. The threaded blind holes 136a/b/c may be arranged to align with the block screw apertures 48 in the mounting plate 18 such that the beveled set screws described above may be screwed into the threaded blind holes 136a/b/c to attach the mounting plate 8 to the mount block 32. A larger lateral bore hole 144 may be formed between the lateral sides of the mount block 32. Two additional threaded set-off bore holes 146a/b may be formed laterally through the mount block 32 above and below the bore hole 144.

As shown in FIGS. 6B and 6C, the pivot block 34 may be similarly formed of a solid block of rigid material (e.g., aluminum) and machined to define a number of features. A body portion 152 of the pivot block 34 may be generally formed as a rectangular cuboid that extends to one lateral side and transitions through top and bottom steps to form a pivot knuckle 154 of a shorter longitudinal length than the body portion 152. The pivot knuckle 154 defines a longitudinal barrel hole 156 therethrough. A set screw bore 158 may be defined within a wall forming the pivot knuckle 154 through to the barrel hole 156. The body portion 152 defies a generally cuboid cavity 36 from open to both the front and back of the pivot block 34. A lateral cylindrical pivot block bore 148 extends through the lateral side of the body portion 152 opposite the pivot knuckle 154 to connect with the cavity 36. Upper and lower threaded angular position bores 150a/b are formed in the body portion 152 above and below the height of the cavity 36. Angle adjustment screws 42a/b are positioned within the angular position bores 150a/b. A set-off pin 160 may be seated in a blind hole and extend from a back surface of the body portion 152 adjacent the upper angular position bore 150a. A rectangular channel 162 may further be defined along the length of the lateral side of the body portion 152 opposite the pivot knuckle 154 such that the opening to the pivot block bore 148 is recessed in the channel 162. As shown, a rectangular washer 162 defining a hole corresponding to the pivot block bore 148 may be placed and retained within the channel 162.

The mount block 32 and the pivot block 34 may be attached together as show in FIG. 6D. The pivot block 34 and washer 164 may be placed adjacent the right side of the mount block 32 of the mount block 32 is attached to the mounting plate 18. The pivot block bore 148 is aligned with the bore hole 144 in the mount block 32. A mount bolt 38 is placed through the bore hole 144 and extends through the pivot block hole 148 and into the cavity 36. A mount nut 40 is positioned in the cavity 36 to receive the threaded end of the mount bolt 38. The cubic configuration of the cavity 36 prevents the mount nut 40 from turning while the mount bolt 38 is tightened to affix the pivot block 34 to the mount block 32. During this mounting process, the set-off screws 166a/b within the set-off bores 146a/b in the mount block 32 may be adjusted to change a set-off distance between the pivot block 34 and the mount block 32. The rectangular washer 164 may provide a harder surface than the material of the pivot block 34 to resist the point pressure exerted by the set-off screws 166a/b when the mount bolt 38 is tightened.

Figure 7:
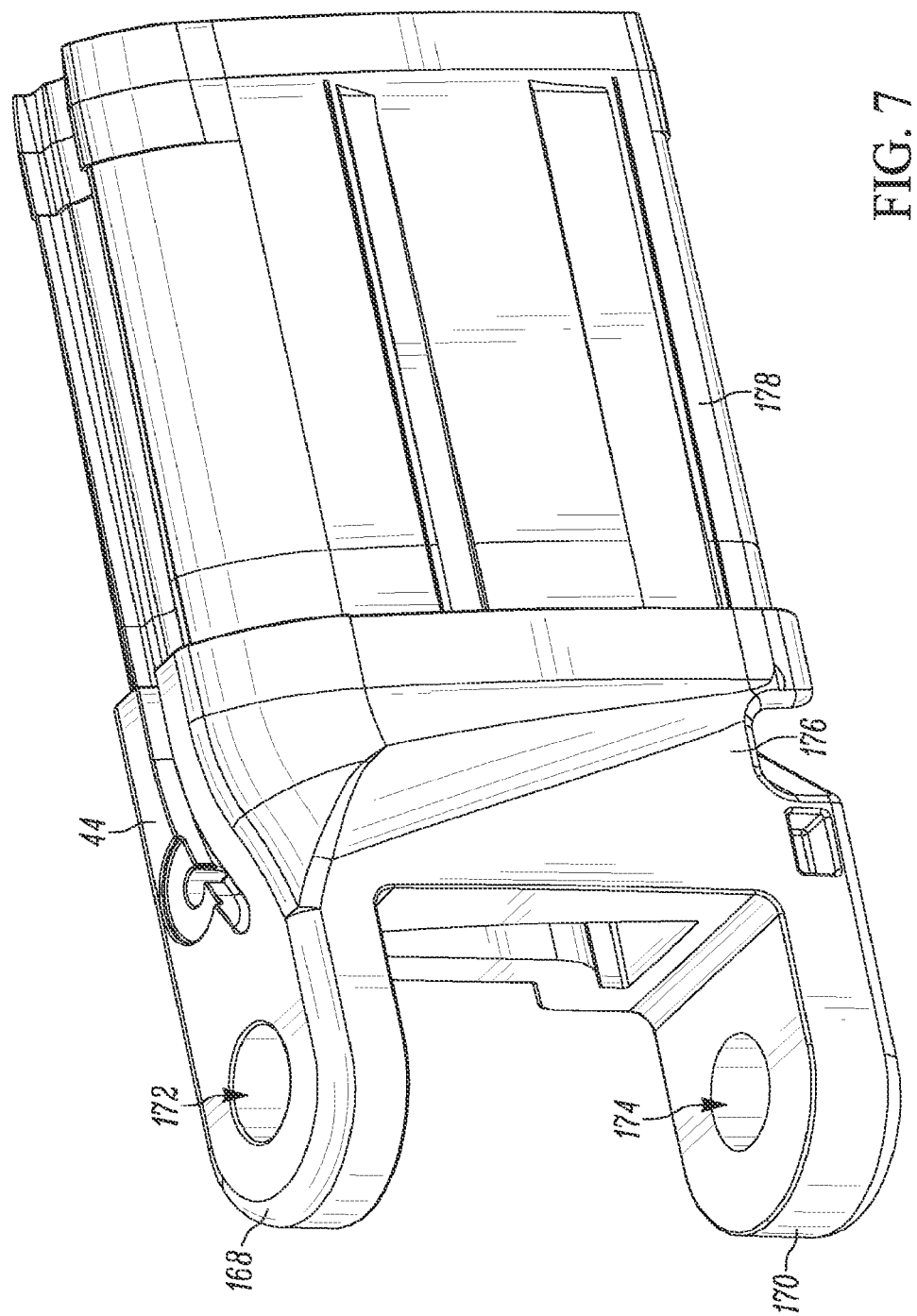
FIG. 7 is a left side isometric view of the arm clevis that forms part of the pivot attachment of the lateral arm awning of FIG. 1.

It may be desirable to adjust the separation distance between the mount block 32 and the pivot block 34 in order to fine tune the separation distance of the arms 10 of the awning 2 at the wall. The set-off screws 166a/b may also be extended or retracted independently to adjust the roll of the arms 10 with respect to a vertical plane to ensure the roller tube 6 at the opposite ends of the arms 10 is substantially horizontal. Similarly, the angle adjustment screws 2a/b in the pivot block 34 may extend through the angular position bores 150a/b in the pivot block 34 to contact a front surface of the mounting plate 18. The angle adjustment screws 42a/b may be extended or retracted independently to adjust the pitch of the arms 10 with respect to a horizontal plane as shown in FIG. 7 to provide an appropriate pitch to canopy 4 to ensure appropriate water drainage from the canopy 4. These roll and pitch adjustments can be made after the awning 2 is fully assembled, allowing for movement between the pivot block 34 and the mount block 32 during such adjustments. The pin 160 may be provided on the back of the pivot block 34, which serves to limit the upper (flattest) pitch adjustment setting to a minimal positive angle, thus preventing a negative pitch angle setting that may result in trapping moisture or rain. The pivot block 34 is pivotably connected to the arm clevis 44 that is further attached to the proximal arm 12 as shown in FIGS. 6D, 6E and 7. The arm clevis 44 is formed with an upper prong 168 and a lower prong 170 that each extend outward from a head portion 176 of the arm clevis 44. The upper and lower prongs 168, 170 have opposing planar surfaces that are separated from each other by a distance slightly greater than the length of the pivot block knuckle 154 such that the knuckle 154 can fit between the upper and lower prongs 168, 170. The upper prong 168 defines an upper prong aperture 172 therethrough, and the lower prong 168 defines a lower prong aperture 174 therethrough. The upper and lower prong apertures 172, 174 are further sized to have a similar or slightly larger diameter as the knuckle barrel 256 and positioned to axially align with the knuckle barrel 256 in the pivot block 34.

As shown in FIG. 6E, as pivot block pin 54 may be placed through each of the upper prong aperture 172, the knuckle barrel 256, and the lower prong aperture 174 to thereby join the pivot block 34 to the clevis 44 in a hinge. Two cylindrical bearing races 64a/b may be placed within respective upper and lower prong apertures 172, 174 and the pivot block pin 54 may be inserted through the bearings 64a/b as well. The bearings 64a/b may be in a race in the form of needle bearings, ball bearings, or any other effective bearing structure. The pivot block pin 54 may define an annular recess 60 about the median of the pivot block pin 54. The base of the annular recess 60 may be splined. The annular recess 60 of the pivot block pin 54 may be aligned with the set screw bore 158 in the sidewall of the pivot block knuckle 154 and the set screw 62 may be advanced through the set screw bore 158 to interface with the annular recess 60 to hold the pivot block pin 54 in place and prevent it from falling out of the knuckle barrel 156 and the upper and lower prongs 168, 170 of the clevis 44. The arm clevis 44 may therefore rotate on the pivot block pin 54 with respect to the pivot block 34. It should be noted that in other embodiments, the pivot hinge could be attached to the proximal arm and the clevis could be formed on the pivot block to achieve the same result.

Figure 6F:
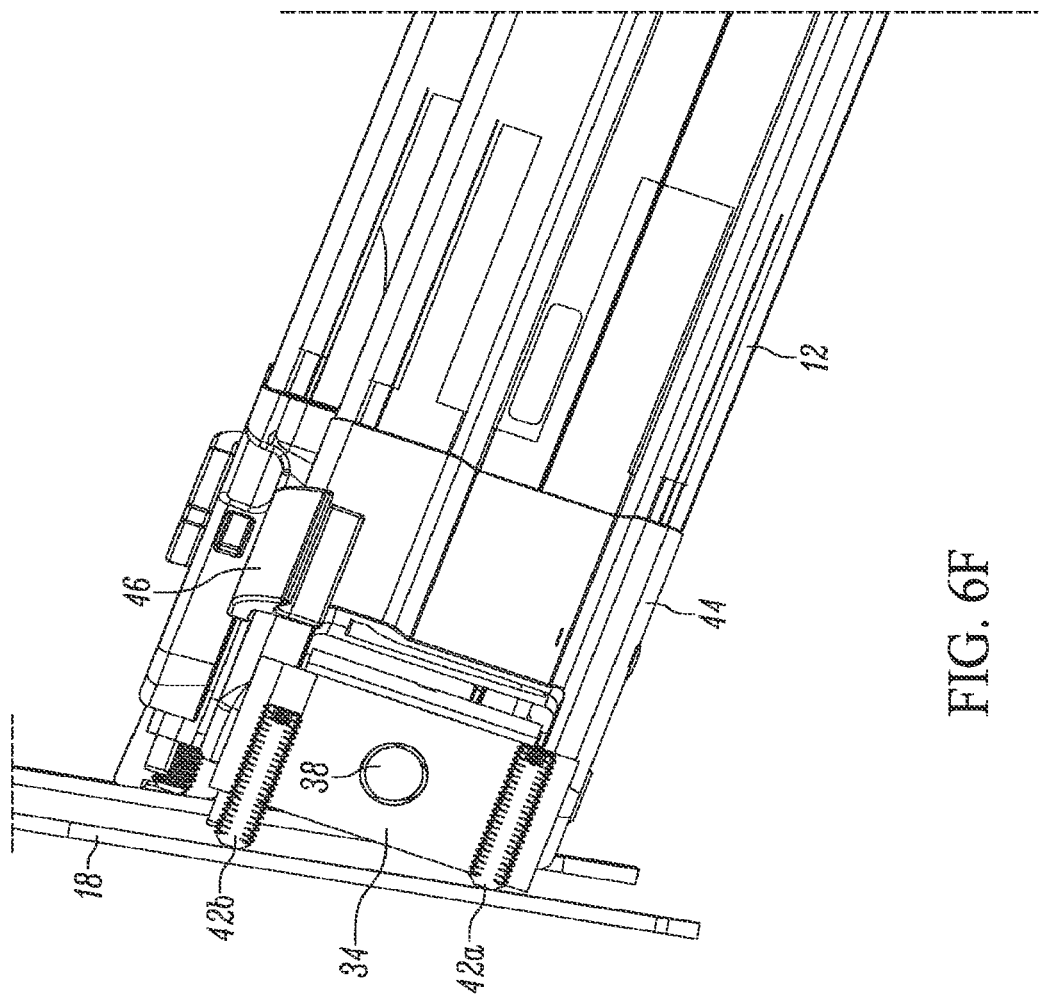
FIG. 6F is a left side isometric view in cross section of a portion of the pivot attachment of an extension arm of the lateral arm awning of FIG. 1 at the mounting plate.

As noted, the extension arms 10 may be composed of a proximal arm 12 and a distal arm 14 pivotally joined together at an arm elbow 16. As shown in FIG. 7, an insert portion 178 of the arm clevis 44 extending from the head portion 176 of the arm clevis 44 may have a smaller outer form factor than the head portion 176. The proximal end of the proximal arm 12 is joined to the arm clevis 44 by sleeving over the insert portion 178 of the arm clevis 44 and abutting against the larger form factor head portion 176. The proximal arm 12 may further be affixed to the arm clevis 44 once sleeved over with screws, bolts, rivets, or other fasteners to hold the two together. A distal arm clip 46 may be mounted to and extend from a surface of the arm clevis 44 as shown in FIGS. 3, 6E, and 6F to interface with, position, and align the distal arm 14 with respect to the proximal arm 14 when the arms 10 are collapsed and the awning 2 is in a stowed position as shown in FIG. 2.

Figure 8:
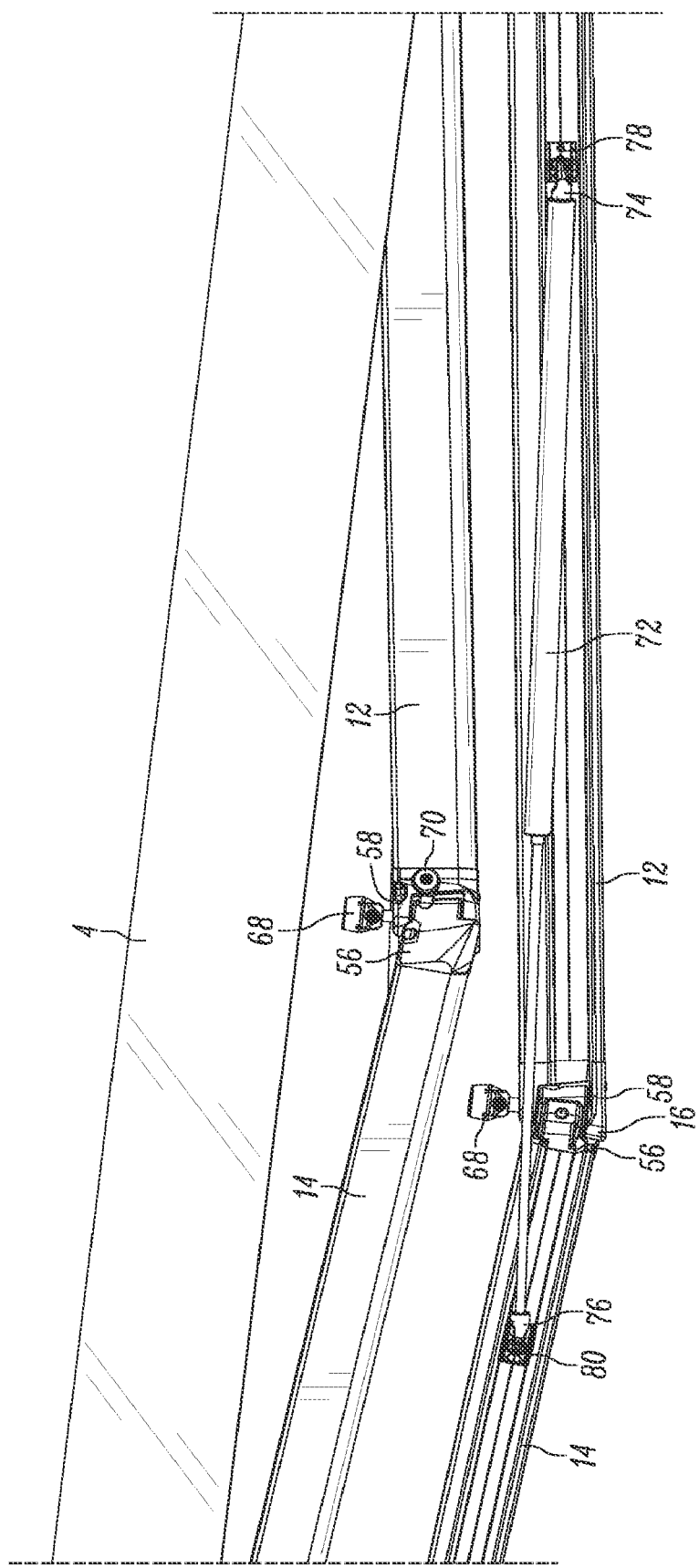
FIG. 8 is a right side isometric view of a portion of the lateral arm awning of FIG. 1 depicting an arm elbow of a right side extension arm between proximal and distal sections of the right side extension arm.

As indicated in FIG. 2, the arms 10 may fold together to stow the roller tube 6 with the furled canopy 4 against the wall or other mounting surface. This is a desirable configuration of the awning 2 in certain situations, e.g., for travel when attached to a motor home or to prevent damage due to forces from high winds or snow load impacting the canopy 4. As shown in FIGS. 2 and 8, when the awning is in an extended position, the extension arms 10 extend outward from the wall or other mounting surface. The proximal and distal arms 12, 14 rotate with respect to each other at the arm elbows 16 such that each proximal arm 12 is closer to being axially aligned with its respective distal arm 14 rather than each set of proximal and distal arms 12, 14 being substantially parallel and adjacent to each other when the awning 2 is in the stowed position.

Figure 9:
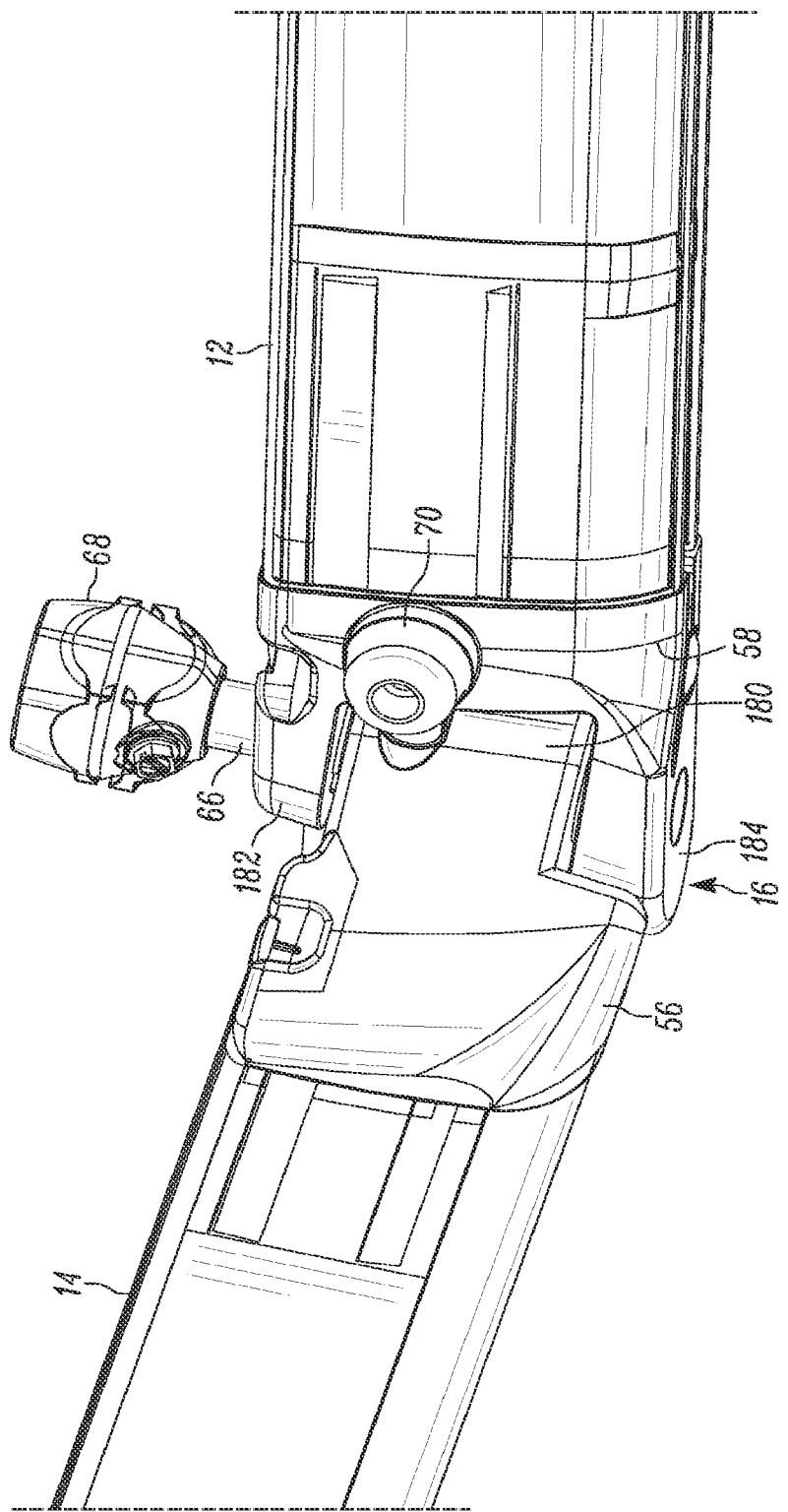
FIG. 9 is a right side isometric view of a portion of the lateral arm awning of FIG. 1 depicting an arm elbow of a left side extension arm between proximal and distal sections of the left side extension arm.

The arm elbows 16 indicate pivot joints between the proximal arms 12 and the distal arms 14. As shown in FIGS. 8 and 9, the distal end of the proximal arm 12 may sleeve over an elbow clevis 58, which is substantially similar in structure to the arm clevis 44 on the proximal end of the proximal arm 12, although the actual form factor of the elbow clevis 58 may be different than that of the arm clevis 44. An elbow pivot 56 may extend from the proximal end of the distal arm 4. The structure of the elbow pivot 56 may be understood as a cross between the structure of the pivot block 34 (specifically the knuckle portion thereof) and the arm clevis 44 (particularly the insert portion thereof). An elbow pivot knuckle 180 of the elbow pivot 56 fits between an upper elbow prong 182 and a lower elbow prong 184 of the elbow clevis 56 and an elbow pin 66 runs through the respective barrel and apertures in each to form a hinge joint between the proximal arm 12 and the distal arm 14. Cylindrical bearing races may line the apertures of the upper elbow prong 182 and a lower elbow prong 184 to provide a low friction interface with the elbow pin 66. The elbow pin 66 may be similar to the pivot block pin 54 and define an annular recess or channel that interfaces with a set screw emerging from a bore in the elbow pivot knuckle 180 to retain the elbow pin 66 therein. It should be understood that in other embodiments, an elbow pivot could be attached to the proximal arm and the clevis could be formed on the distal arm to achieve the same result.

However, the elbow pin 66 may be formed differently than the pivot block pin 54 to extend out of the hole in the upper prong 182 of the elbow clevis 58. As shown in FIG. 8, the extended portion of the elbow pin 66 is covered by a pin cap 68 that pushes the canopy 4 above and away from the elbow joint 16 to prevent the material of the canopy 4 from being caught with the elbow joint 16. The pin cap 68 also provides a tear-resistant interface with the material of the canopy 4 as it unfurls and furls and the arms articulate underneath the canopy 4 back and forth between stowed and extended positions.

The right and left pivoting mounting hinge structures 31 provide a first pivotal connection with the proximal arms 12 of the lateral arms. This first pivotal connection is fixedly pivotally connects the lateral arms to their respective pivoting mounting hinge structure 31. State another way, the fixedly pivotally connection allows for only rotational movement, but does not allow for the translation of the proximal arms 12 when the canopy 4 is being extended or in an unfurled position (see FIG. 1) or when in the furled or retracted position (see FIG. 2).

Figure 10:
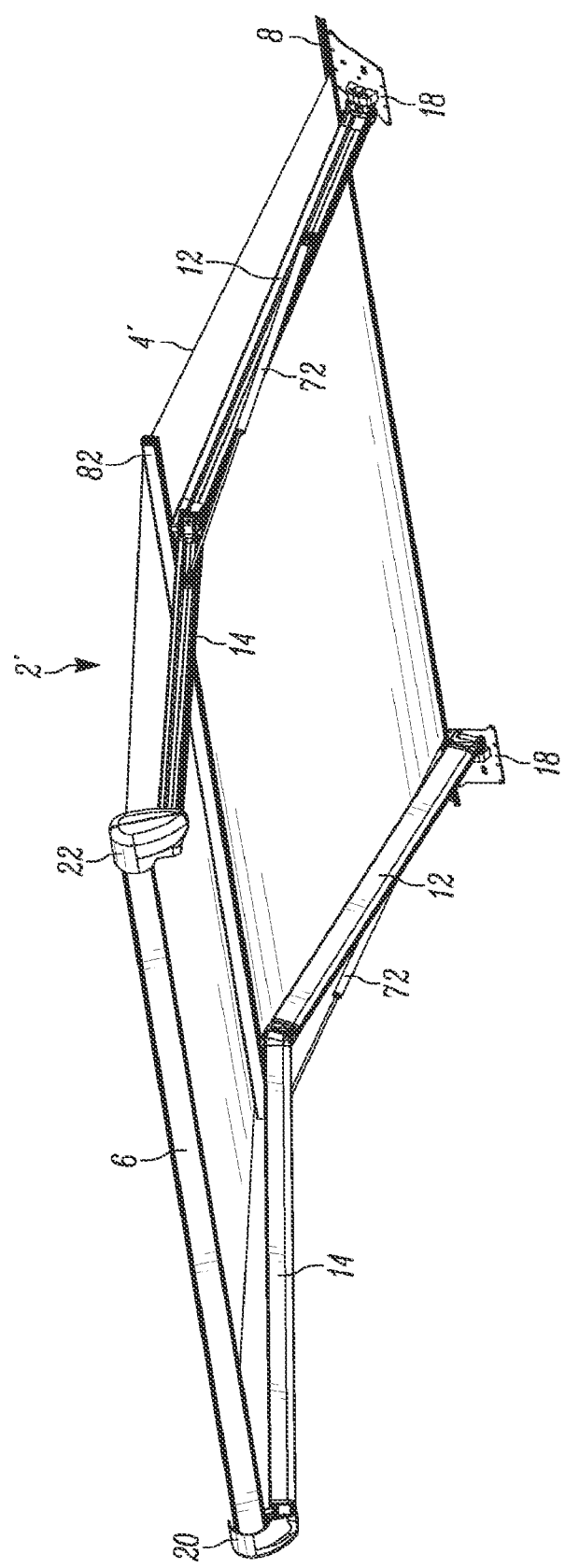
FIG. 10 is a bottom right isometric view of an alternate lateral arm awning having an intermediate canopy support.
Figure 11:
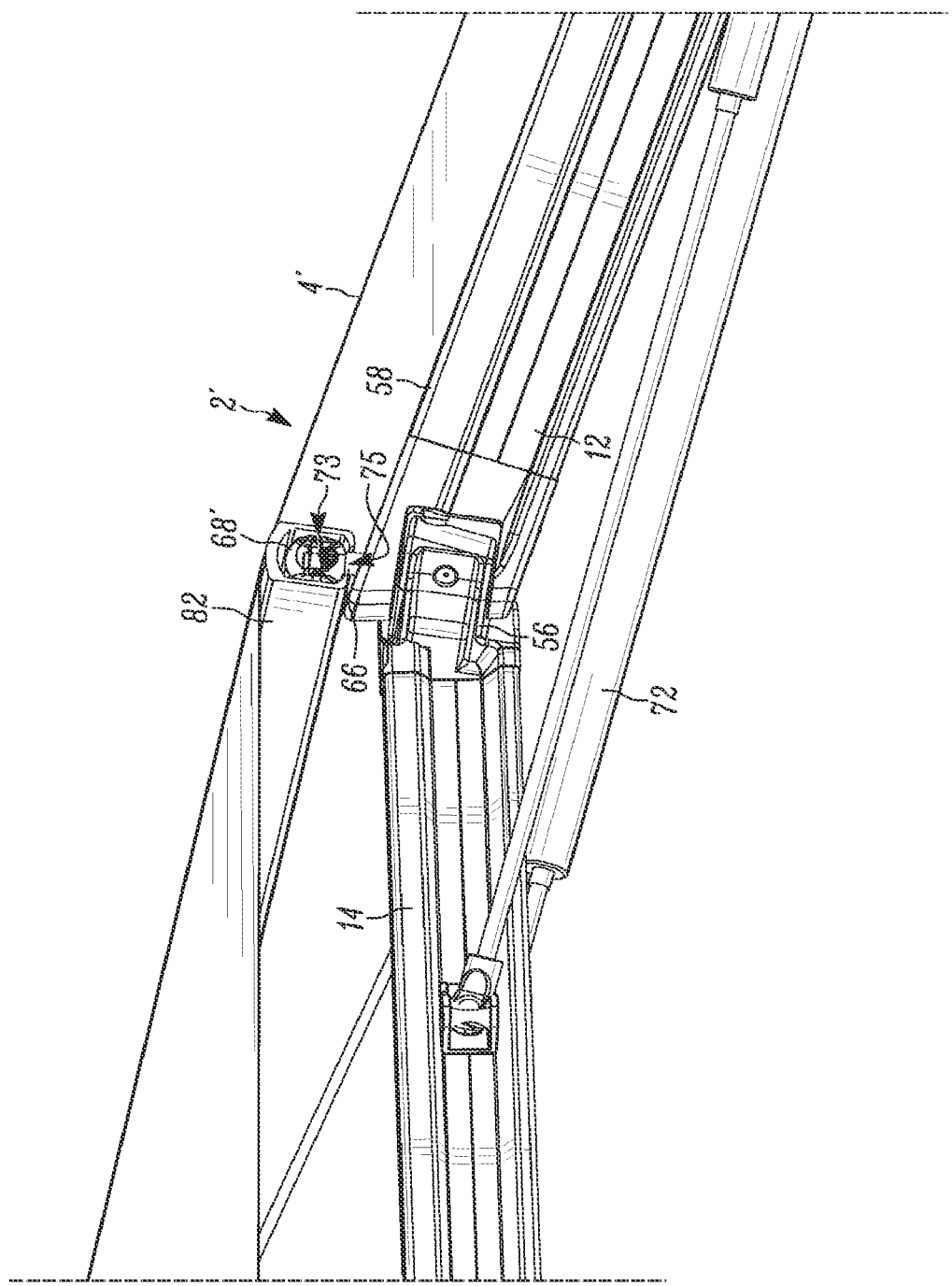
FIG. 11 is a right side isometric view in partial cross section of a portion of the lateral arm awning of FIG. 10 depicting an arm elbow of a right side extension arm between proximal and distal sections of the right side extension arm and a connection between the arm elbow and the intermediate canopy support.

In an alternate example embodiment shown in FIGS. 10 and 11, the awning 2' includes a mid-rail support 82 that is essentially a bar that extends underneath and supports the canopy 4' at a position halfway between the support surface and the roller tube 6. In this embodiment, the elbow pin cap 66 on top of the elbow pin 66 is replaced with a mid-rail guide 68' that similarly is affixed atop the elbow pin 66. However, the mid-rail guide 68' may be designed to fit within a channel 73 defined within and along the length of the mid-rail guide 82. The elbow pin 66 may extend through a slot 75 running the length of the mid-rail guide 82 that opens in to the channel 73. The mid-rail guide 68' may be formed of a rigid material with low surface friction such that the mid-rail guide 68 may easily slide within and along a length of the channel 73 in the mid-rail support 82 as the extension arms 10 articulate between open and stowed positions of the awning 2'.

An elbow bumper 70 may be affixed to an inside surface of the elbow clevis 58 to provide a set-off between the proximal arm 12 and the support surface when the awning 2 is in the stowed position. The elbow bumper 70 may be made of plastic, rubber, or an elastomeric material to dampen the mechanical interaction between the extended arms 10 and the wall or other support structure when the awning 2 is stowed.

In the illustrated example embodiment of FIG. 9, the pin cap 68 resides on the end of the elbow pin 66. The pin cap 68 is further captured behind the roller 6 when in the furled position in order to drive the elbow bumper 70 tight against the mounted structure S. The bumper 70 is located at such position in order to properly secure the unsupported elbow end of the arm when the awning 2 is in the furled position and to provide stationary support during transit of the recreational vehicle.

Figure 23:
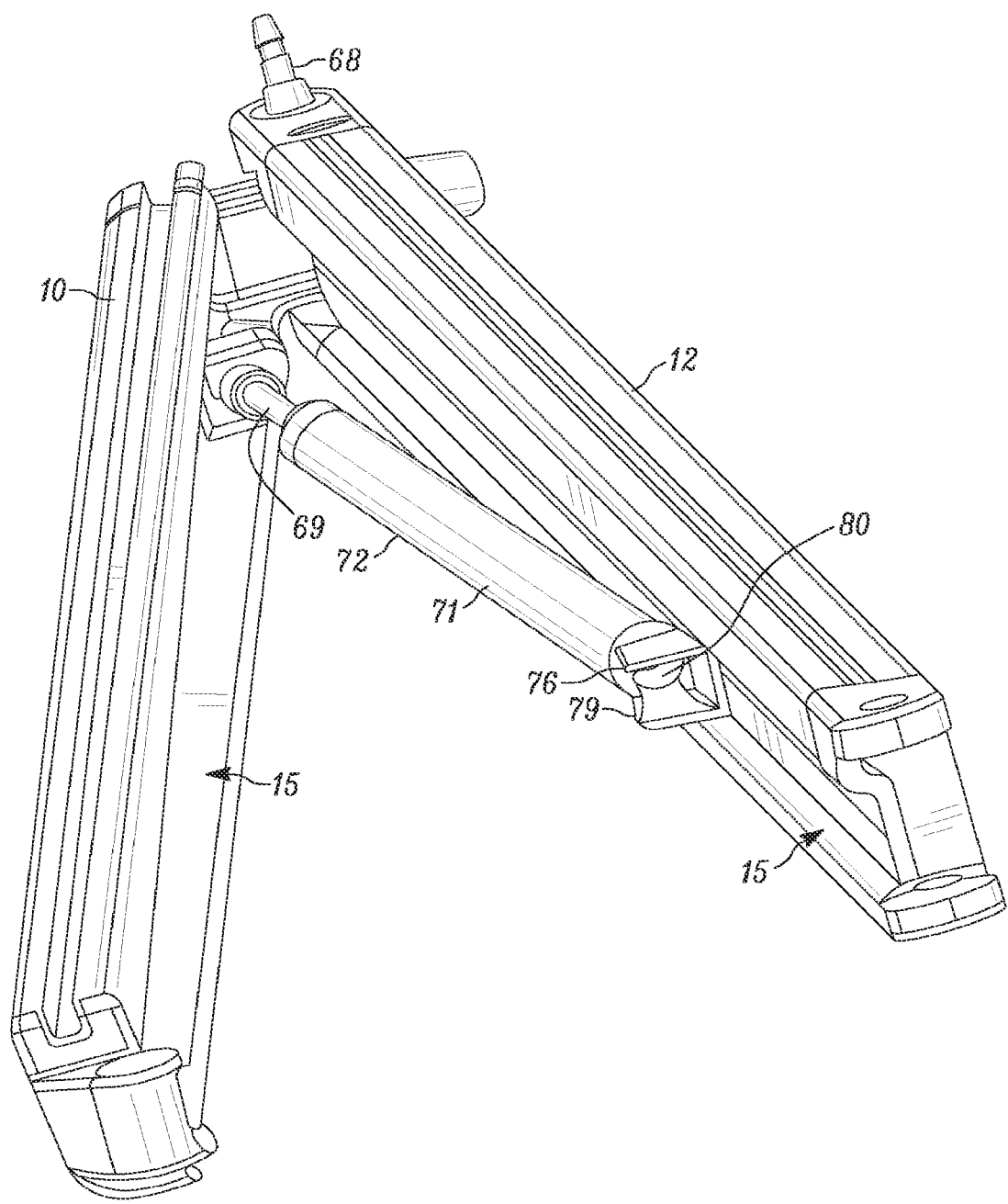
FIG. 23 is an isometric view of a gas spring connected between proximal and distal sections of an extension arm.

As shown in FIGS. 8 and 23, opposing ends of a gas spring 72 may be affixed to the distal arm 14 and the proximal arm 12, of each of the extended arms 10, respectively. A proximal clip 74 on a first end of the gas spring 72 may connect with a proximal support 78 provided at an intermediate location along the length of the proximal arm 12. Likewise, a distal clip 76 on an opposite end of the gas spring 72 may connect with a distal support 80 provided at an intermediate location along the length of the distal arm 14. The gas springs 72 may provide tension on the roller tube 6 as it unfurls and furls the canopy 4 under the direction of a motor in to ensure the canopy 4 remains taught.

Figure 25:
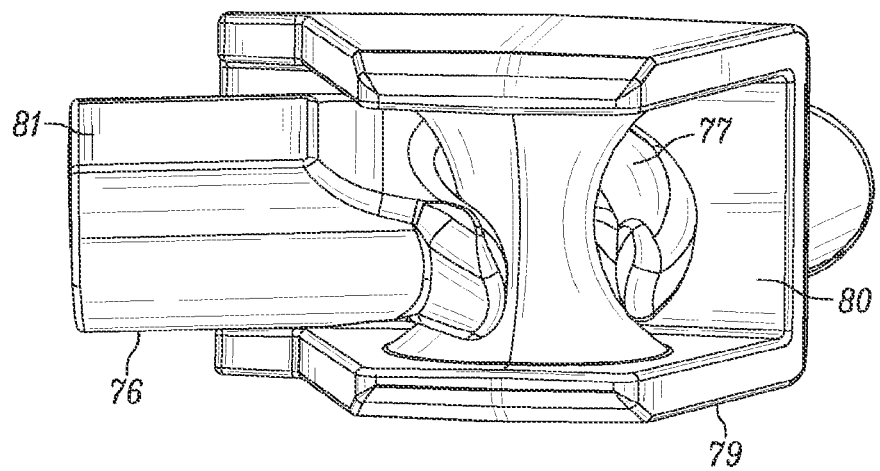
FIG. 25 is an isometric view of a clip hand on an end of the gas spring attached to a spring post that mounts to a respective extension arm.
Figure 26A:
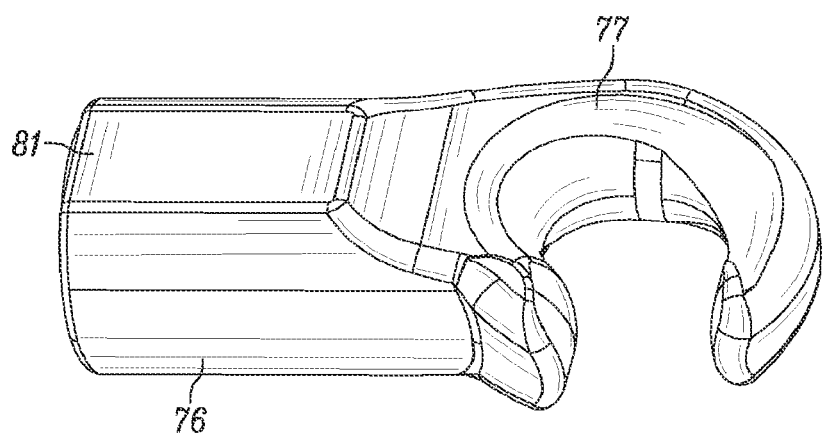
FIG. 26A is a top isometric view of the clip hand of FIG. 25.
Figure 26B:
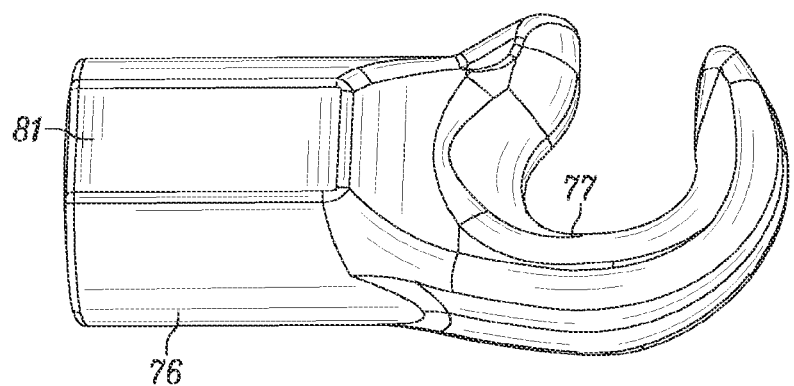
FIG. 26B is a bottom isometric view of the clip hand of FIG. 25.

The proximal and distal supports 78, 80 may define a spring post 79 to which the proximal and distal clips 74, 76 attach. The spring post 79 may be shaped similar to an hourglass as shown in greater detail in FIG. 25 in order to aid in the attachment of the clips 74, 76. As shown in FIGS. 26A and 26B, a grasping portion 77 of the clips 74, 76 may be shaped in the in the form of a "C" or a cupped hand with a "thumb" and a curled "finger" extending from a cylindrical wrist 81 that attaches to either the piston 69 or the tube 71 of the gas springs 72. Each side, as well as the inner wall of the C-shaped grasping portion 77 of the clips 74, 76 is contoured to allow the clips 74, 76 to fit between the post 79 and a mounting wall of the supports 78, 80 and curve around the post 79 to attach thereto. The clips 74, 76 may be formed of a strong molded plastic that has a sufficient elastic modulus to provide slight flexibility to allow the clips 74, 76 to easily pop on and off of the posts 79, but to remain firmly in place when the awning is maintained under tension by the canopy 4. In some embodiments, the elbow pin 66 may be easily removable from the elbows 16 to allow the extension arms 10 to collapse and remove the force of the canopy 4 in order to more easily remove and replace the gas springs 72.

Figure 24:
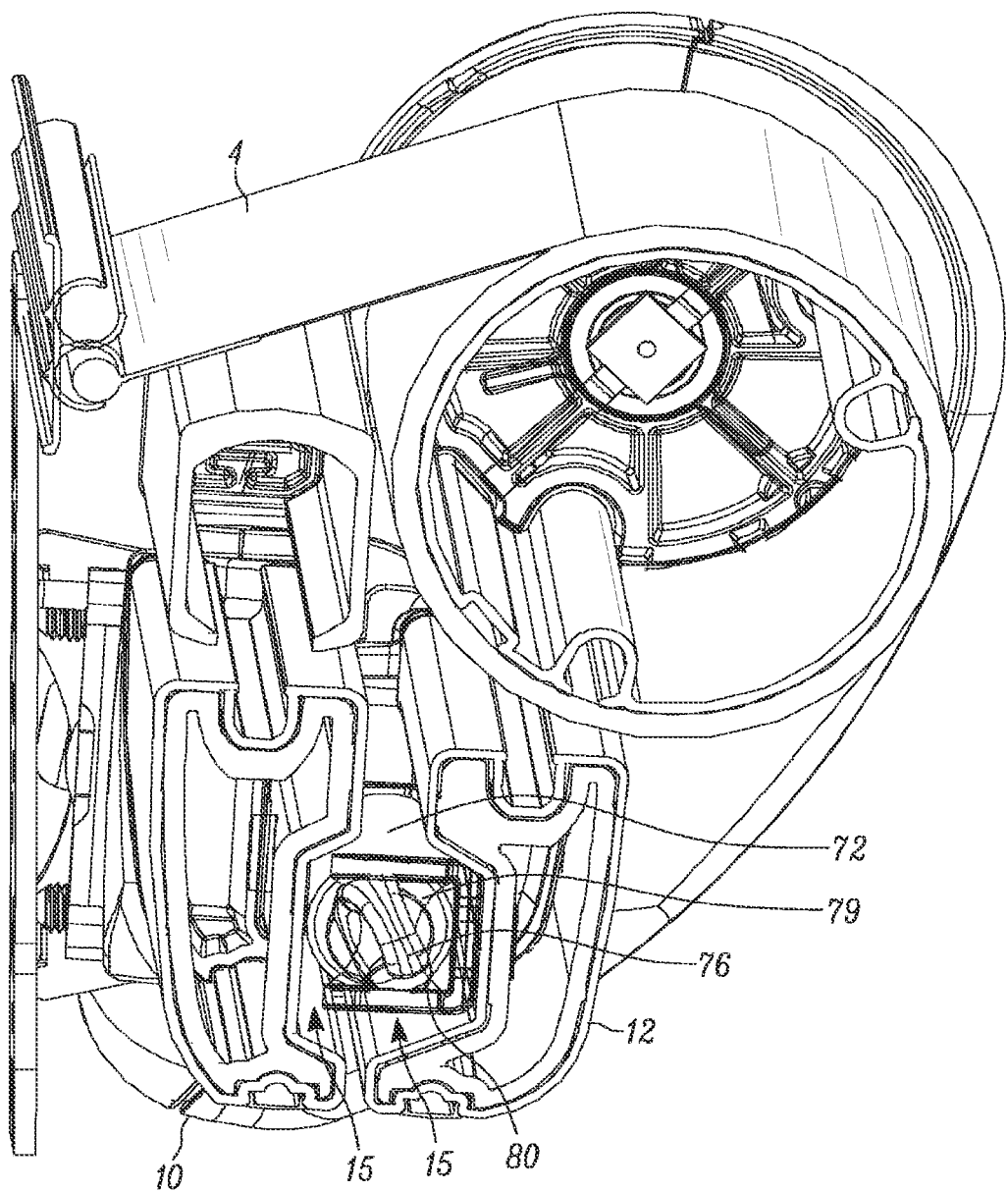
FIG. 24 is an isometric view in cross section of the lateral arm awning in a closed position enclosing the gas spring between proximal and distal sections of the right side extension arm.

Additionally, as shown in FIGS. 23 and 24, when the extension arms 10 are retracted and the canopy 4 is furled, the gas springs 72 may nest within channels 15 formed in the proximal and distal arms 12, 14. The proximal and distal arms 12, 14 may be formed as monocoque structures that in the illustrated example embodiment of FIG. 24 comprise tubes of extruded aluminum having a central cavity strengthened a plurality of sidewalls, wherein one sidewall defining an inner recess forming the channels 15 along the length of the one sidewall. The outer surfaces of the proximal and distal arms 12, 14 thus form C-shaped perimeters in cross section as can be seen in FIG. 24. In this design, the gas springs 72 are concealed within the opposing channels 15 of the proximal and distal arms 12, 14 when the awning 2 is retracted as shown in FIG. 24, which provides for a sleek and compact form.

Attachment between the distal arms 14 and the roller tube 6, and the structures supporting such attachment, is shown in greater detail in FIGS. 12-22. In particular, FIGS. 12-19 depict the right roller cap 22 and associated attachment structures between the right side of the roller tube 6 and the respective distal arm 14, which is slightly different than the left roller cap 20 and associated attachment structures between the left side of the roller tube 6 and the respective distal arm 14 because the right side houses and supports a drive motor 84. To this end, the right end cover 83 may be larger and of a different form factor than the left end cover 85 in order to accommodate the motor 84 and system controller hardware 86.

The motor 84, system controller hardware 86, and a gear housing 188 are all mounted to a right roller bracket 88 that also pivotably connects with the extension arms 10 and rotationally connects with the roller tube 6, thereby supporting the roller tube 6 and the motor on the distal end of the extension arm 10 while still allowing the extension arm 10 to articulate. The right roller bracket 88 is depicted in greater detail in FIGS. 15 and 16. The right roller bracket 88 may be a cast metal piece, e.g., of cast aluminum, steel, or other material, able to provide the necessary hardness and tensile strength to support the roller tube 6 and motor 84 on the end of the extension arm 10. The inner wall 186 and back facing wall 190 of the right roller bracket 88 that are adjacent to the roller tube 6 and canopy 4 may have smooth surfaces in order to minimize the possibility of interference with the operation of the roller tube 6 or the material of the canopy 4. The form factor of these walls 186, 190 may be designed in any desirable way in order to accommodate the form and size of the motor 84 and gear housing 188 and other components related to the drive system for the roller tube 6. The back facing wall 190 may be formed with a bumper receptacle 100 (among other features) for connection of a lateral bumper 30 to provide a set-off between the right roller cap 22 and the support surface when the awning is in the stowed position. The inner wall 186 may be generally flat with several protrusions extending therefrom toward the roller tube including a cylindrical axle journal 98, a lower clevis mount 90 and an upper clevis mount 92.

The right and left roller brackets 88, 114, respectively provide a second pivotal connection with the distal arms 14 of the lateral arms. This second pivotal connection is fixedly pivotally connects the lateral arms to their respective brackets 88, 114. State another way, the fixedly pivotally connection allows for only rotational movement, but does not allow for the translation of the distal arms 14 when the canopy 4 is being extended or in an unfurled position (see FIG. 1) or when in the furled or retracted position (see FIG. 2).

While the right roller bracket 88 houses the drive motor 84, it should be appreciated that other energizing or mobility devices 101 could be used to advance the roller tube 6, canopy 4, and lateral arms 12, 14 away from the sidewall or support structure S (see FIG. 2). For example, the right roller bracket 88 in one example embodiment contains a device 101 such as a torsion spring or manual gear box.

The axle journal 98 may be further reinforced with counterforts 99 or other external rib structures extending between the inner wall 186 and the exterior wall of the axle journal 98. The axle journal 98 further defines an aperture 192 that extends therethrough and further through the inner wall 186 to an outer side 187 of the right roller bracket 88 where the motor 84 is attached. A shaft of the right side of the roller tube 6 may seat within and be supported by the axle journal 98. The outer side 187 may be reinforced with a number of ribs 194 extending normally therefrom to add strength to the right roller bracket 88 so that the walls 186, 190 can be formed relatively thin, thereby reducing the weight that must be supported by the arms 10 and the mounting plates 18 on the mounting surface. There can be any number of ribs 194 of varying lengths, widths, and thicknesses, arranged in any order or position as desired or designed to appropriately strengthen the right roller mount 88 for the loads and stresses that it needs to accommodate. The right roller mount 88 may further define a number of motor mounts 96a/b/c aligned with corresponding attachment structures on the motor 84 and the gear housing 188. The motor mounts 96a/b/c may define threaded boreholes that receive bolts to attach the motor 84 and the gear housing 188 to the right roller mount 88. In other embodiments the boreholes in the motor mounts 96a/b/c may not be threaded and the bolts can merely be attached with nuts either adjacent to the inner wall 186 or adjacent to the motor 84 depending upon which direction a bolt is inserted.

Figure 12:
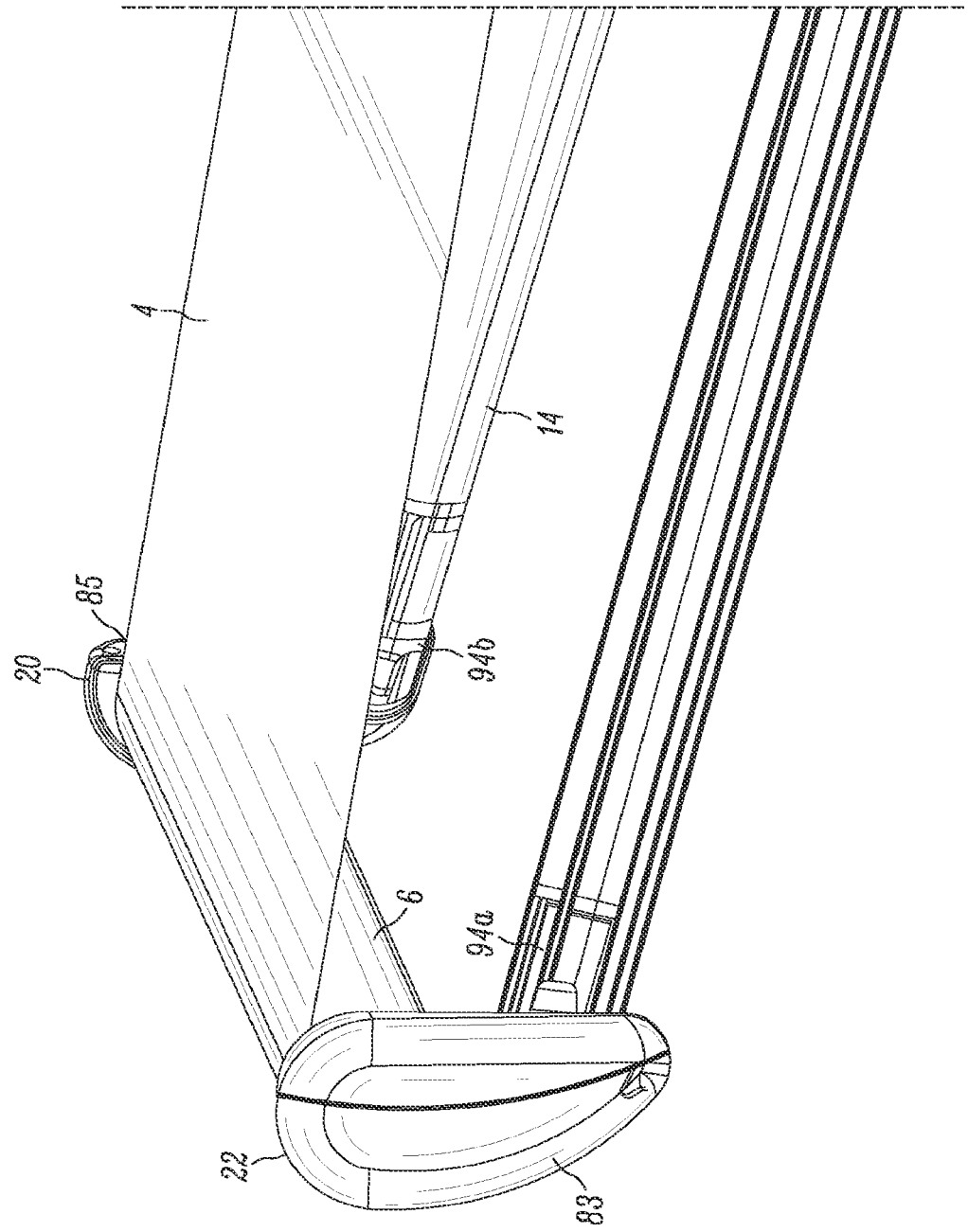
FIG. 12 is a right rear isometric view of a distal portion of the lateral arm awning of FIG. 1 depicting the distal end of the lateral arm awning.
Figure 13:
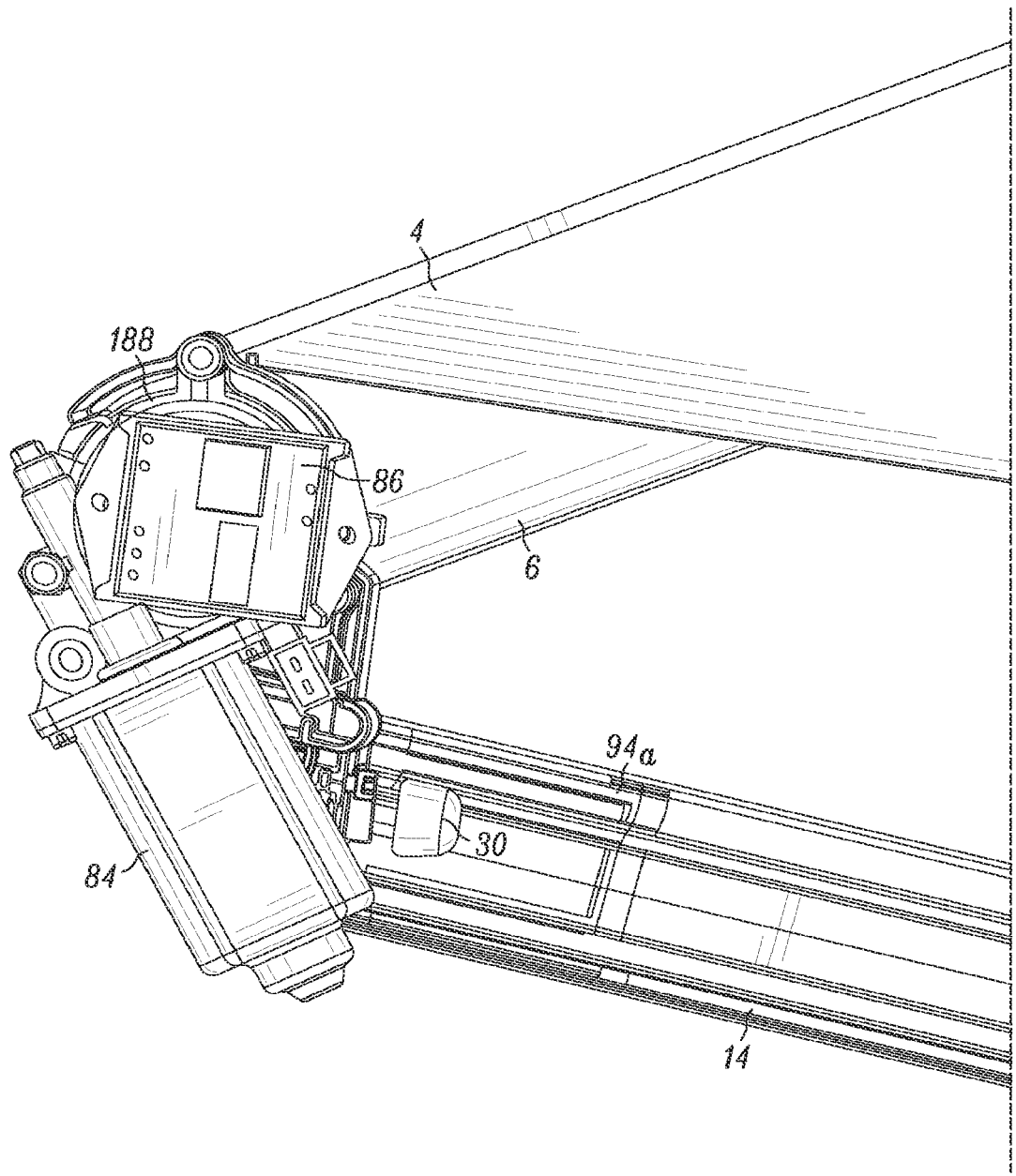
FIG. 13 is a right side isometric view of a distal portion of the lateral arm awning of FIG. 1 with the right side roller cover removed.
Figure 14:
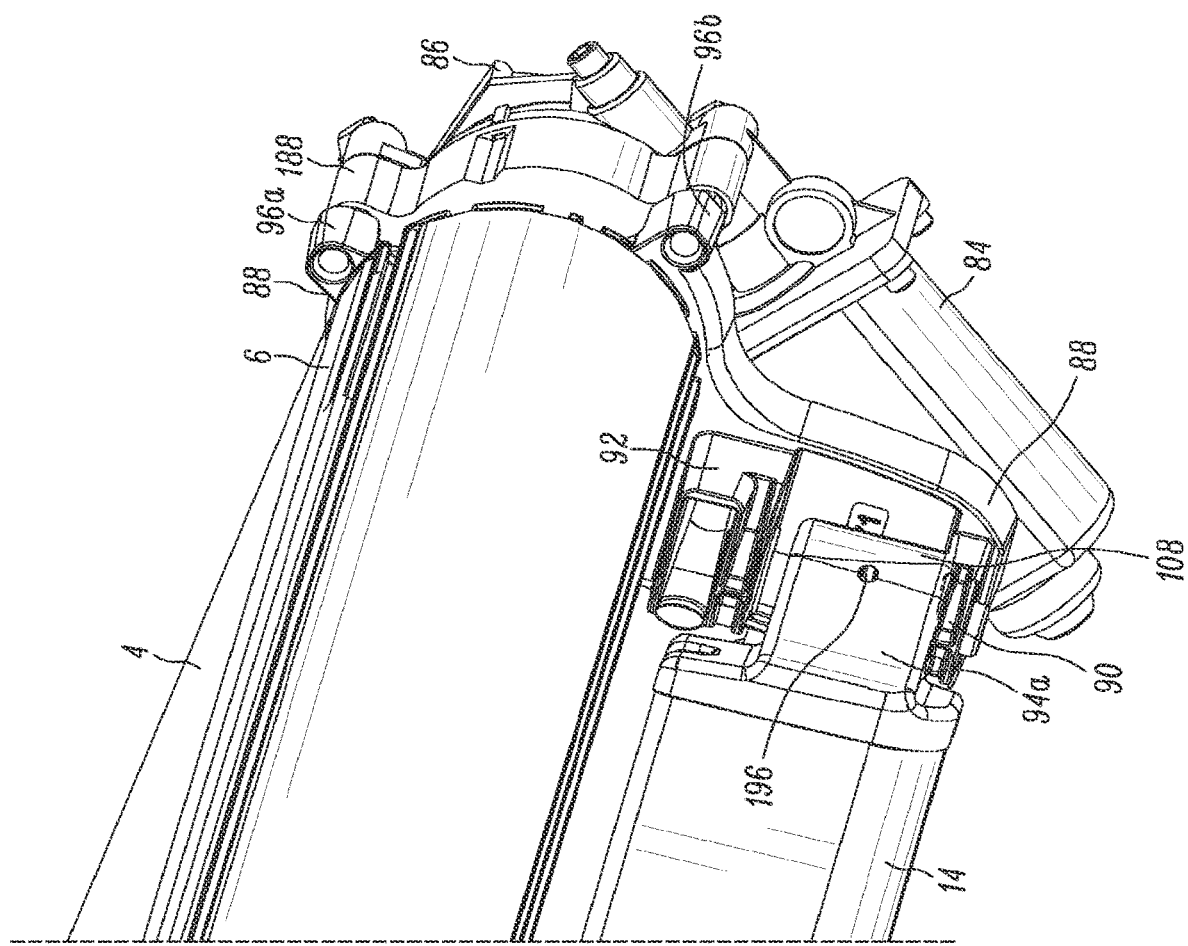
FIG. 14 is a left front isometric view of a distal portion of the lateral arm awning of FIG. 1 with the right side roller cover removed.
Figure 15:
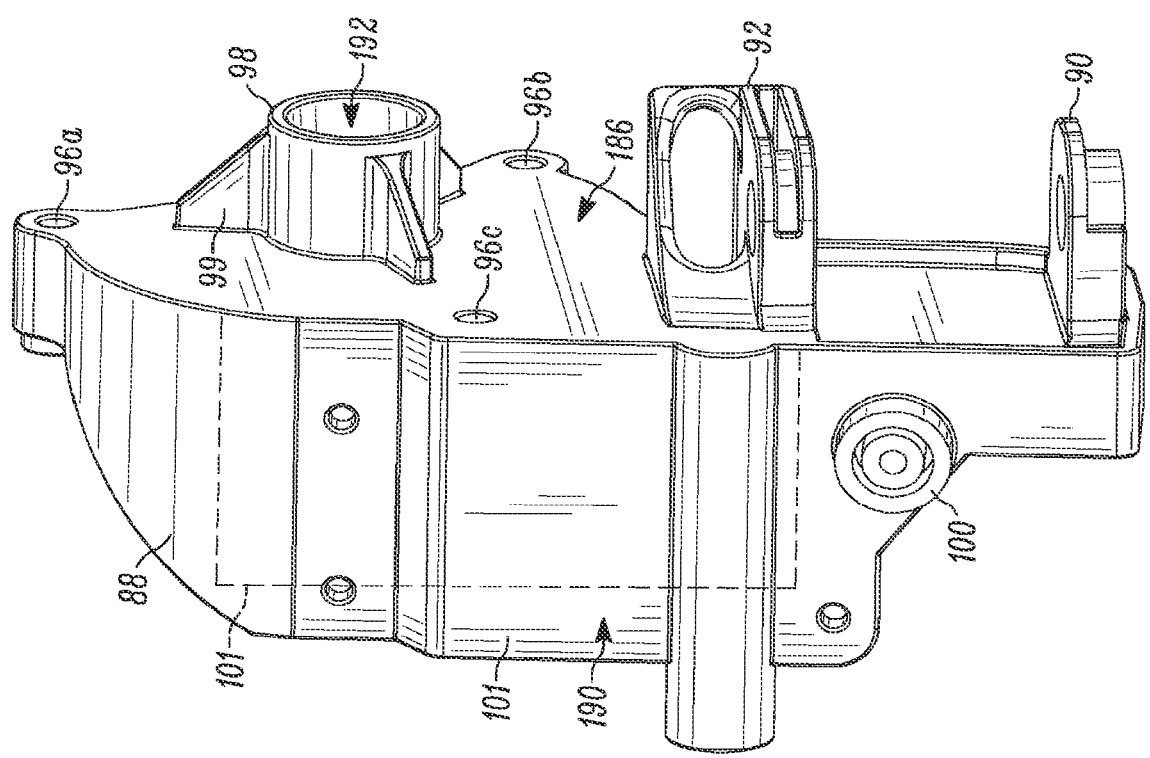
FIG. 15 is a left rear isometric view of a right roller bracket from the lateral arm awning of FIG. 1.
Figure 16:
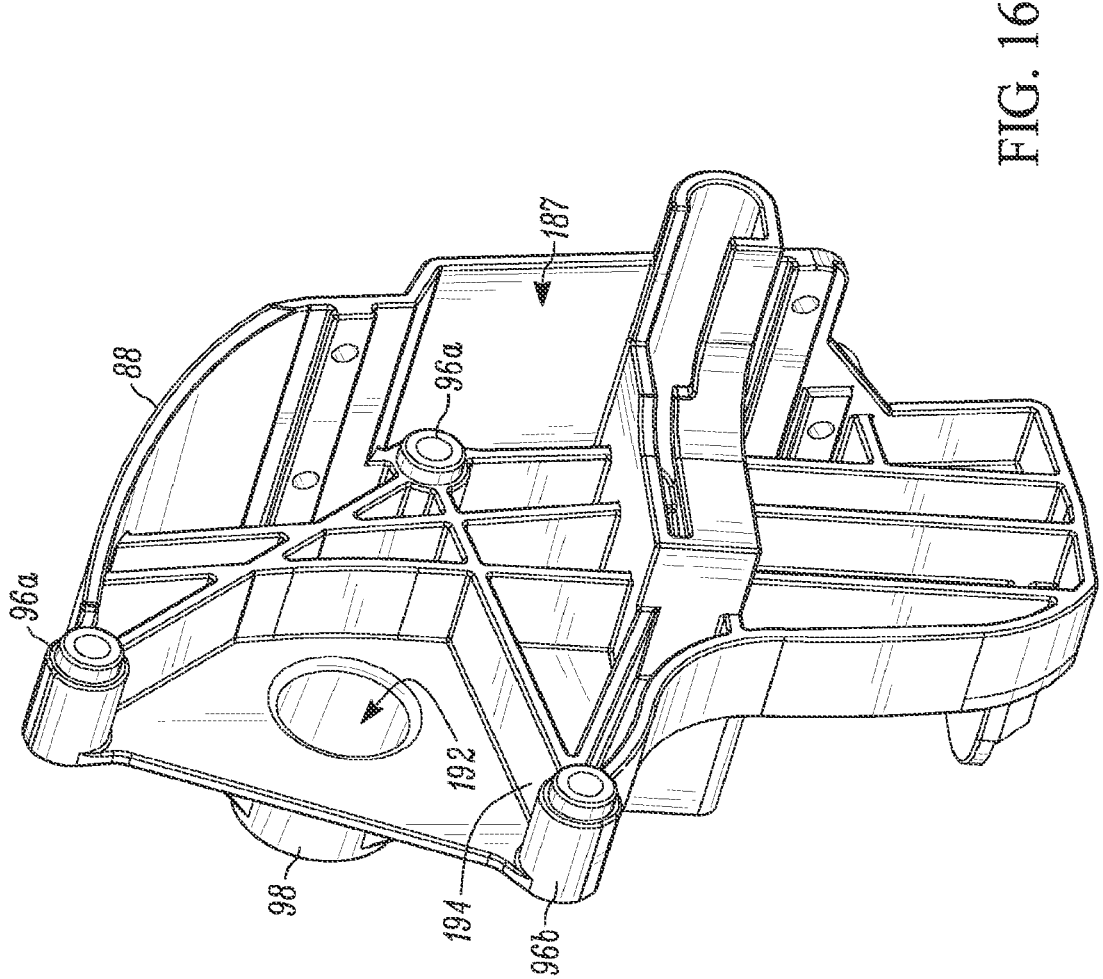
FIG. 16 is a right front isometric view of the right roller bracket of FIG. 15.
Figure 17:
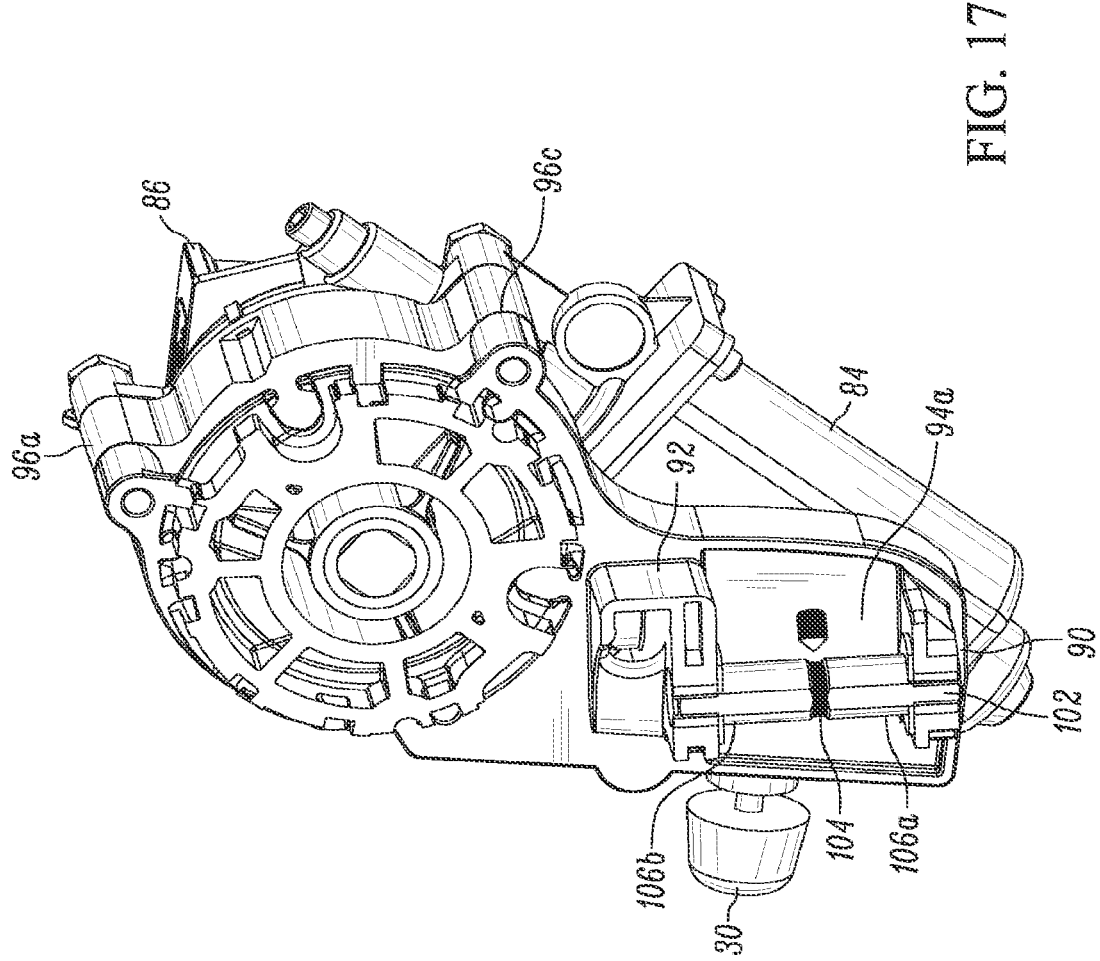
FIG. 17 is a left front isometric view in partial cross section of a distal portion of the lateral arm awning of FIG. 1 with the right side roller cover removed.
Figure 18:
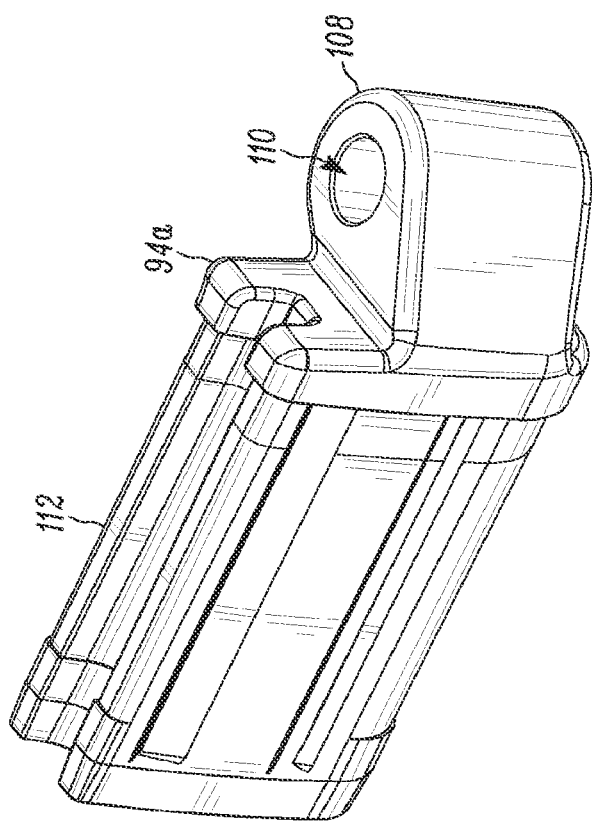
FIG. 18 is a top left isometric view of an arm hinge that attaches the right distal arm section to the right roller bracket of the lateral arm awning of FIG. 1.
Figure 19:
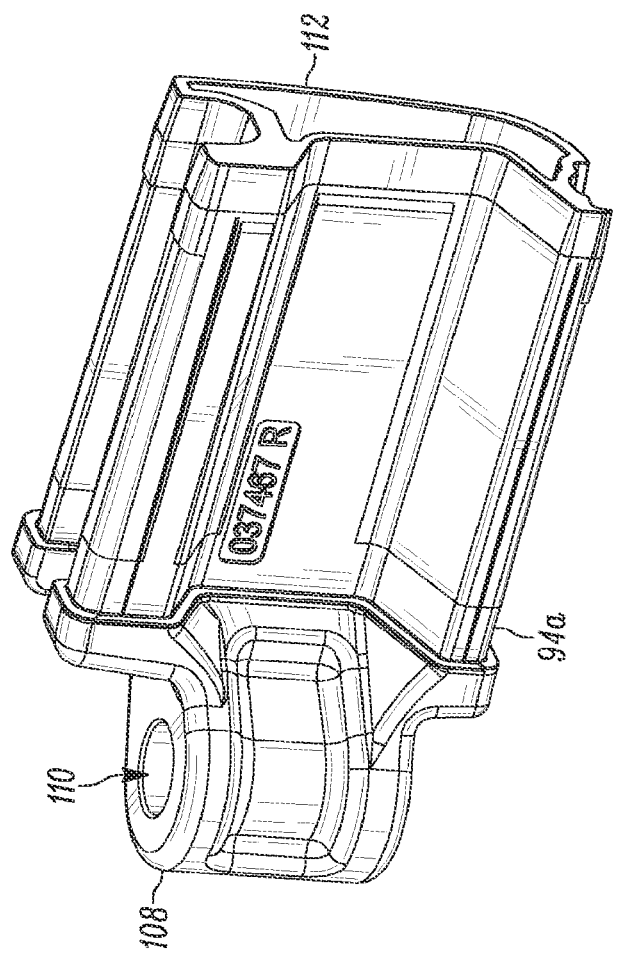
FIG. 19 is a right side isometric view of the arm hinge of FIG. 18.

The lower and upper clevis mounts 90, 92 may be similar in form to the prongs extending from the arm clevis 44 and the elbow clevis 58. However, the orientation of the lower and upper clevis mounts 90,92 is normal to the face of the inner wall 186. As shown in FIGS. 12, 13, and 17, an arm hinge 94a is attached to the distal end of the distal arm 14. The distal arm 14 may sleeve over an insert portion 112 of the arm hinge 94. As shown in FIGS. 18 and 19, a hinge knuckle 112 defining a hinge barrel 110 extends from the insert portion 112 of the arm hinge 94a at an obtuse angle with respect to the longitude of the insert portion 112 and, consequently, with respect to the longitude of the distal arm 14. This angular orientation allows the arm hinge 94a to more easily interface with the lower and upper clevis mounts 90, 92 extending from the inner wall 186.

The hinge knuckle 112 of the arm binge 94a is pivotably connected to the lower and upper clevis mounts 90, 92 in substantially the same manner as the arm clevis 44 attaches to the pivot block 34. A hinge knuckle 108 fits between the lower and upper clevis mounts 90, 92 and an arm pin 102 runs through the hinge barrel 110 and apertures in each of the lower and upper clevis mounts 90, 92 to form a hinge joint between the distal arm 14 and the right roller bracket 88. Cylindrical bearing races 106a/b may line the apertures of the lower and upper clevis mounts 90, 92 to provide a low friction interface with the arm pin 102. The arm pin 102 may be similar to the pivot block pin 54 and define an annular recess 104 or channel that interfaces with a set screw 196 emerging from a bore in the elbow pivot knuckle 180 to retain the elbow pin 66 therein. It should be understood that in other embodiments, a hinge knuckle could be attached to the inner wall 186 of the right roller bracket 88 and the clevis could be formed on the arm hinge extending from the distal arm 14 to achieve the same result.

Figure 20:
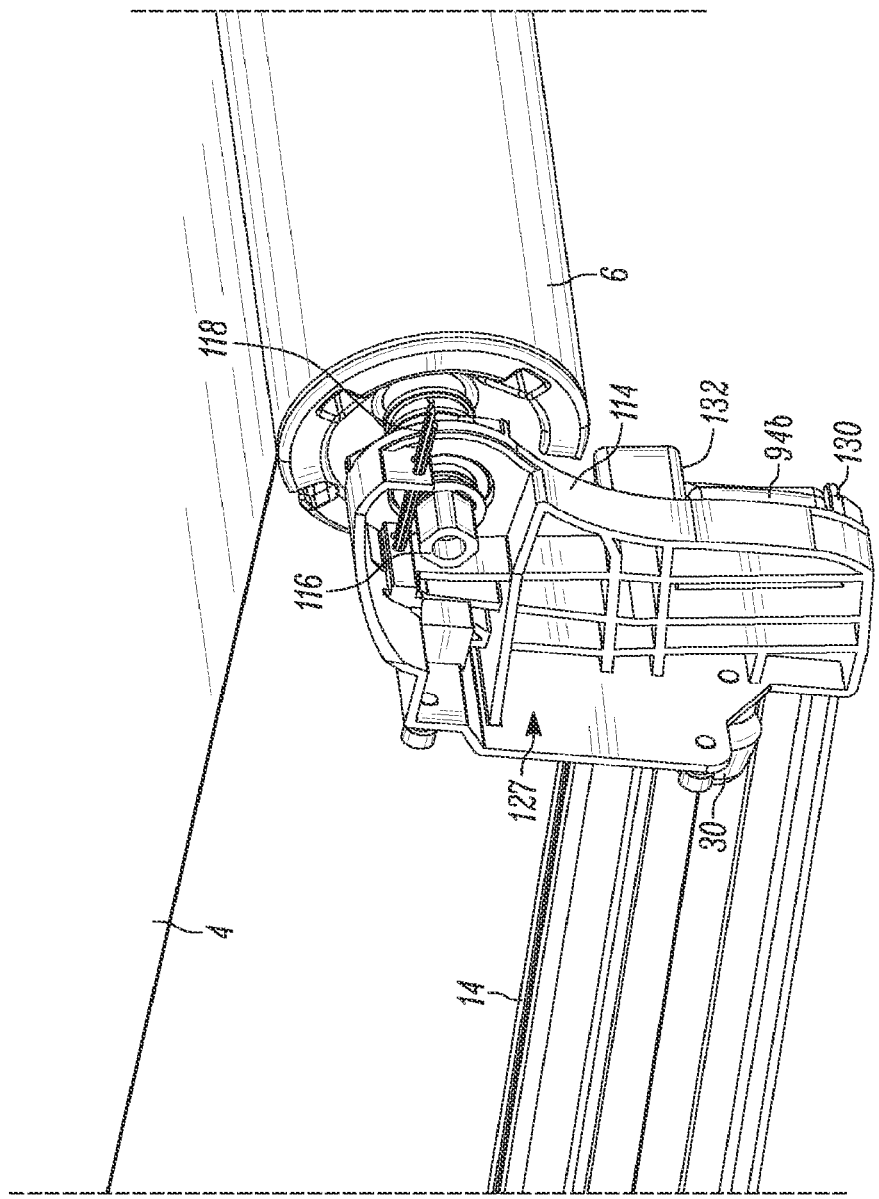
FIG. 20 is a front left isometric view of a distal portion of the lateral arm awning of FIG. 1 with the left side roller cover removed.
Figure 21:
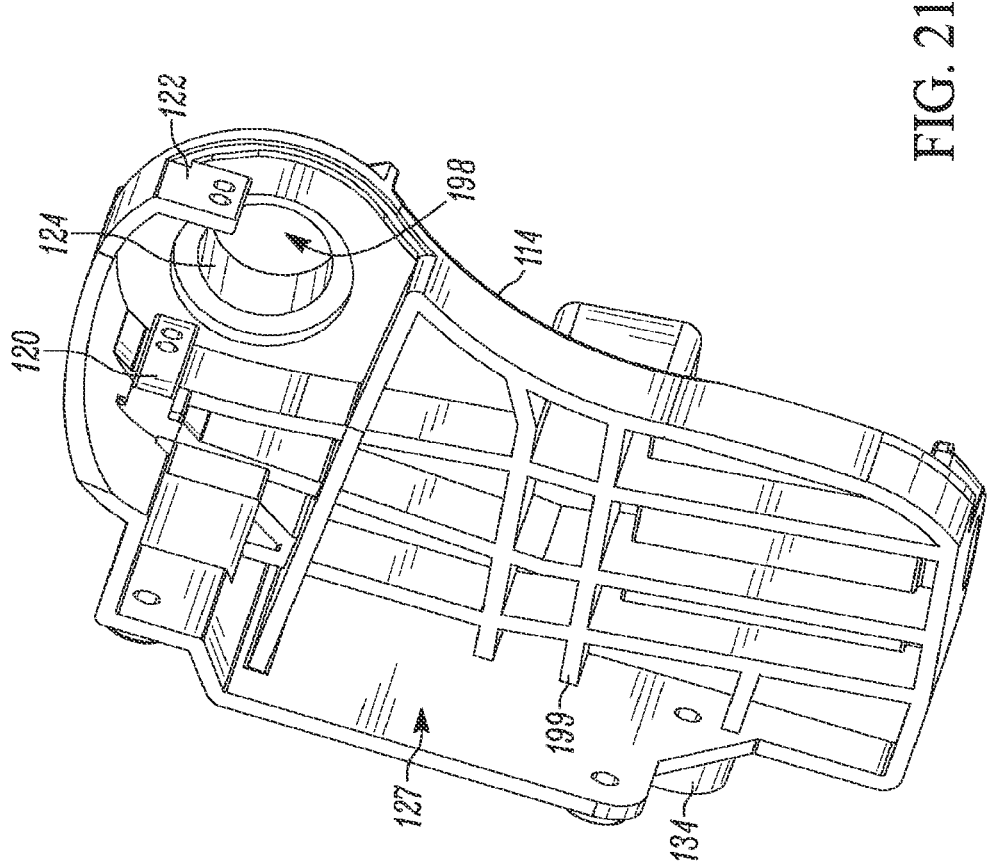
FIG. 21 is a right rear isometric view of a left roller bracket from the lateral arm awning of FIG. 1.
Figure 22:
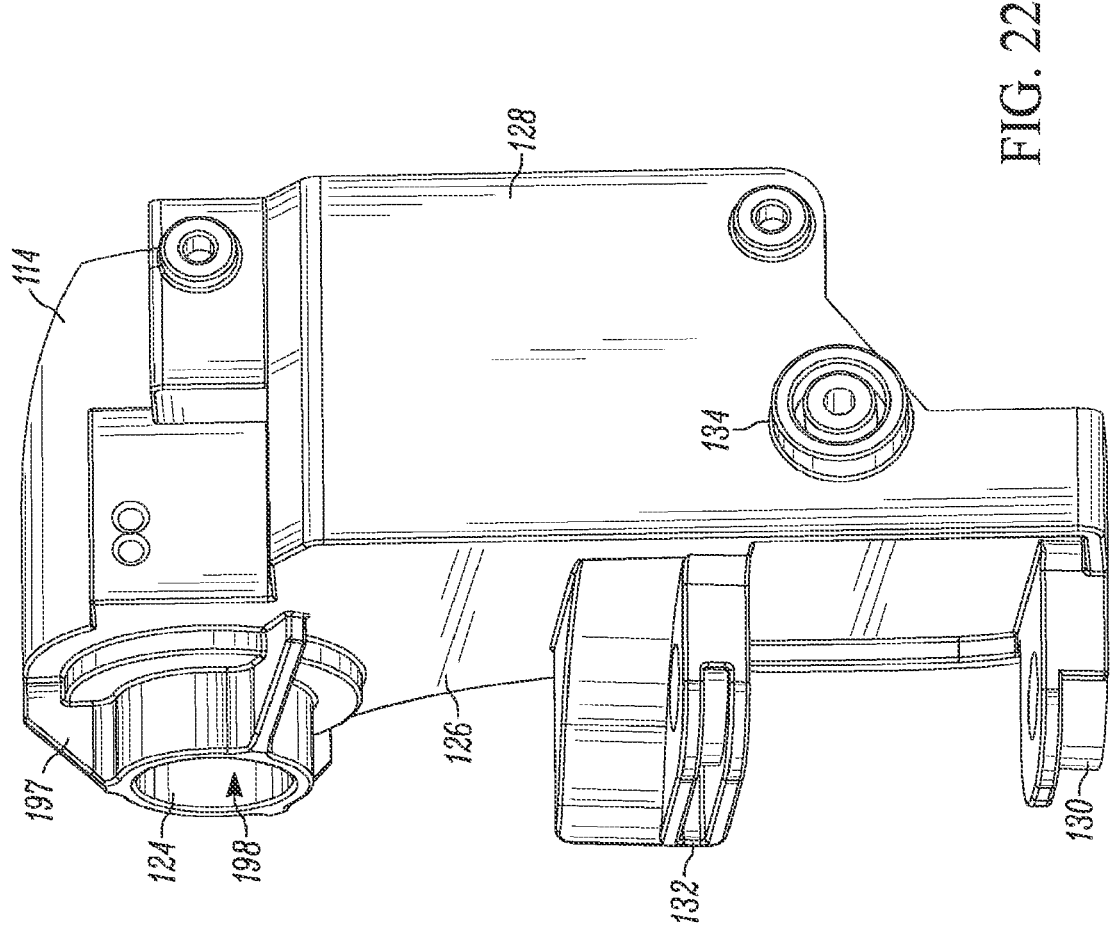
FIG. 22 is a front isometric view of the left roller bracket of FIG. 21.

A left roller cap 20 as depicted, for example, in FIG. 2 with associated attachment structures, shown in greater detail is FIGS. 20-22 is similar in many respects to structures in the right roller cap 22 previously described. The left end cover 85 is removed in FIG. 20 to reveal a left roller bracket 114, which is similar in structure to the right roller bracket 88 except that it does not need to support a motor. The left roller bracket 114 may be a cast metal piece, e.g., of cast aluminum, steel, or other material, able to provide the necessary hardness and tensile strength to support the roller tube 6 and motor 84 on the end of the extension arm 10. An inner wall 126 and back facing wall 128 of the left roller bracket 114 that are adjacent to the roller tube 6 and canopy 4 may have smooth surfaces in order to minimize the possibility of interference with the operation of the roller tube 6 or the material of the canopy 4. The form factor of these walls 126, 128 may be designed in any desirable way in order to accommodate the form and size of the other components related to the mounting system for the roller tube 6. The back facing wall 128 may be formed with a bumper receptacle 134 as illustrated in FIGS. 21 and 22 (among other features) for connection of a lateral bumper 30 to provide a set-off between the left roller cap 22 and the support surface when the awning 2 is in the stowed position. The inner wall 126 may be generally flat with several protrusions extending therefrom toward the roller tube including a cylindrical axle journal 124, a lower clevis mount 130 and an upper clevis mount 132.

The axle journal 124 may be further reinforced with counterforts 197 or other external rib structures extending between the inner wall 126 and the exterior wall of the axle journal 124. The axle journal 124 further defines an aperture 198 that extends therethrough and further through the inner wall 126 to an outer side 127 of the left roller bracket 114. A shaft 116 of the left end of the roller tube 6 may seat within and be supported by the axle journal 124. The outer side 127 may be reinforced with a number of ribs 199 extending normally therefrom to add strength to the left roller bracket 114 so that the walls 126, 128 can be formed relatively thin, thereby reducing the weight that must be supported by the arms 10 and the mounting plates 18 on the mounting surface. There can be any number of ribs 199 of varying lengths, widths, and thicknesses, arranged in any order or position as desired or designed to appropriately strengthen the left roller mount 114 for the loads and stresses that it needs to accommodate.

A top portion of the outer side 127 may be formed with a proximal cotter support 120 and a distal cotter support 122 positioned across at least a portion of the aperture 198 of the axle journal 124, with one of the supports 120, 122 on either side of the aperture 198. Each of the proximal cotter support 120 and the distal cotter support 122 define a pair of apertures for receipt of a corresponding pair of cotter pins 118 or other similar pin or rod. The cotter pins 118 may be inserted through the cotter supports 120, 120 during assembly and optionally for shipping to maintain a tight interface with the shaft 116 of the roller tube 6. This prevents the roller tube 6 from sliding axially within the axle journal 124 during assembly in order to easily adjust the components of the awning 2 to proper positions and tolerances. When the cotter pins 118 are removed for operation, the additional space or "slop" around the shaft 116 allows the roller tube 6 room to expand and contact axially in response to weather conditions (i.e., heat and cold). In addition, the cotter pins 118 prevent undue stress and resultant binding of the arms 12, 14 and roller tube 6 during operation of the awning 2.

The lower and upper clevis mounts 130, 132 may be similar in form to the lower and upper clevis mounts 90, 92 on the right roller bracket 88 normal to the face of the inner wall 126. An arm hinge 94b is attached to the distal end of the distal arm 14 and is substantially the same as the arm hinge 94a that attaches to the right roller bracket 88, but is formed as a mirror opposite thereof. The distal arm 14 may sleeve over an insert portion of the arm hinge 94b. The hinge knuckle of the arm hinge 94b is pivotably connected to the lower and upper clevis mounts 130, 132 in substantially the same manner as with respect to the right roller bracket 88, including the pin and bearing arrangements. It should be understood that in other embodiments, a hinge knuckle could be attached to the inner wall 126 of the left roller bracket 114 and the clevis could be formed on the arm hinge extending from the distal arm 14 to achieve the same result.

This unique structural design combining of the separate mounting plates 18 for attachment to the motor home wall or other mounting surface and the mount block 32 and pivot block 34 at the proximal end of the awning, and the left and right roller brackets 88, 124 that support the roller tube 6 and the motor 84 at the distal end, which further allow the articulating lateral arms to pivotably connect to the roller tube 6, provide for a new lateral arm awning with the motor and roller mounted at the distal end. This achieves many advantages, including a reduction in parts and materials needed to build the awning, and thereby a reduction in cost and avoids the problems associated with vertical arm awnings noted previously, which heretofore were the only design known in which the motor and roller tube could be mounted on a distal end of an awning.

Although various embodiments of this invention have been described above with a certain degree of particularity, or with reference to one or more individual embodiments, those skilled in the art could make numerous alterations to the disclosed embodiments without departing from the spirit or scope of this invention. All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

The awning assembly 2 illustrated in the figures and described in the above example embodiments advantageously eliminates typical construction elements that significantly contribute to higher cost. For example, by positioning the drive motor 84 on the roller tube 6 at the distal end of the awning arms 12, 14, the lead rail of conventional awning assemblies is eliminated. As well, conventional aluminum housing or boxes that support the canopy along the structural or sidewall of the house or motor home can also be eliminated. Since the canopy 4 is retracted from the roll tube 6 as it moves away from the sidewall, only a modest extrusion is needed by way of the canopy rail 8 and its rail tube 24 that allows the canopy 4 to be conveniently slipped into location during its initial assembly. Thus, this compact awning assembly 2 design eliminates bulky housings, large support structures of conventional awning systems found on the sidewalls, and their associated cost.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%. The term "coupled" as used herein is defined as connected or in contact either temporarily or permanently, although not necessarily directly and not necessarily mechanically. A device or structure that is "configured" in a certain way is configured in at least that way, but may also be configured in ways that are not listed.

To the extent that the materials for any of the foregoing embodiments or components thereof are not specified, it is to be appreciated that suitable materials would be known by one of ordinary skill in the art for the intended purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A lateral arm awning assembly comprising:
   first and second articulating arms having first and second ends, said first ends of said articulating arms being mounted upon assembly to a support surface at separate lateral locations, the first ends each comprising separate mounting structures for forming a first connection with said first and second articulating arms, said first and second articulating arms having first and second lateral arms coupled to first and second proximal arms by first and second elbows, respectively;
   a roller tube having spaced lateral ends that provide a second connection to said second ends of said first and second articulating arms, said first and second articulating arms extending by moving said first and second elbows away from each other, wherein the first and second articulating arms are solely providing support for the roller tube in the extended position; and
   said roller tube supporting a canopy coupled to a roller shaft.

2. The lateral arm awning assembly of claim 1 wherein said roller shaft supports a device that drives said roller shaft for furling and unfurling said canopy, said device comprises a drive motor.

3. The lateral arm awning assembly of claim 1 wherein a spring is coupled to a distal arm and a proximal arm of the first articulating arm.

4. The lateral arm awning assembly of claim 1 wherein said second connection on said second ends of said first and second articulating arms are pivotally fixedly attached to said roller tube at least partially via a bracket, the bracket rotationally supporting the roller tube.

5. The lateral arm awning assembly of claim 1 wherein said canopy when in an unfurled or extended position is supported solely by said first and second articulating arms.

6. The lateral arm assembly of claim 1 wherein said separate mounting structures forming the first connection on said first ends of said first and second articulating arms are pivotally fixedly attached to a support structure, respectively, during use.

7. The lateral arm assembly of claim 1 wherein said second connection on said second ends of said first and second articulating arms are pivotally fixedly attached to said roller tube via a shaft of the roller tube and an axle journal.

8. The lateral arm assembly of claim 1 wherein said second connection on said second ends of said first and second articulating arms are pivotally fixedly connected to said roller tube.

9. The lateral arm assembly of claim 1 further comprising first and second springs each coupled to respective first and second articulating arms, said first and second springs providing tension to said canopy during furling and unfurling positions of the awning assembly.

10. The lateral arm assembly of claim 9 wherein said first and second articulating arms further comprise a channel extending along at least a portion of a length of said first and second articulating arms.

11. The lateral arm assembly of claim 10 wherein the channel conceals first and second springs coupled to the first and second articulating arms when said canopy is in a furled position.

12. A method of operating a lateral arm awning assembly, the method comprising the steps of:
providing separate mounting structures for mounting at separate lateral locations of a support surface;
providing first and second articulating arms having first and second ends, the first ends of the first and second articulating arms to be coupled to the mounting structures to form a first connection with said first and second articulating arms and said support surface, said first and second articulating arms comprising first and second distal arms coupled to first and second proximal arms by first and second elbows, respectively; and
providing a roller tube supporting a canopy, the roller tube having spaced lateral ends, the second ends of the first and second articulating arms for supporting the lateral ends, said articulating arms for moving said roller tube away from said support surface as the canopy extends from a furled position to an unfurled position, said first and second elbows moving toward each other as the canopy extends from the furled position to the unfurled position, said roller tube supported solely by said first and second articulating arms when the canopy is in the unfurled position.

13. The method of operating a lateral arm awning assembly of claim 12 comprising providing a drive motor for moving said roller tube.

14. The method of operating a lateral arm awning assembly of claim 12 wherein the providing the roller tube comprises providing a shaft, said first and second articulating arms to be pivotally fixedly attached to said roller tube via the shaft.

15. The method of operating a lateral arm awning assembly of claim 12 wherein the providing the roller tube comprises providing a shaft, and providing an aperture connected to said first and second articulating arms to be rotationally house to said roller tube via the shaft.

16. The method of operating a lateral arm awning assembly of claim 12 comprising providing said first and second articulating arms to be coupled to the support surface, said first and second articulating arms comprising independent structures.

17. A lateral arm awning assembly comprising:
first and second mounting plates mounted upon installation directly to a surface structure at spaced lateral locations;
first and second articulating arms each including a proximal arm pivotably connected to a distal arm at an arm elbow, said proximal arm of each of said first and second articulating arms comprising separate pivoting mounting structures for forming a pivotally fixed connection with said first and second mounting plates, said first and second articulating arms further comprise a channel extending along at least a portion of a length of said first and second articulating arms, wherein the channel conceals first and second springs coupled to the first and second articulating arms when a canopy is in a furled position; and
a roller tube supported by the distal arms, said roller tube supporting a said canopy coupled to a roller shaft, the roller shaft rotationally supported by a bracket supported by the distal arms, wherein said first and second articulating arms comprise independent structures that solely support said canopy in the unfurled position, wherein the arm elbows move toward each other when moving into the unfurled position.

18. The lateral arm awning assembly of claim 17, wherein said arm elbows move toward each other during furling, and away from each other during unfurling.

19. The lateral arm assembly of claim 17, wherein said first and second articulating arms comprise a sole support for said roller tube.

20. The lateral arm assembly of claim 17 wherein said distal arms are pivotally fixedly attached to said roller tube via the shaft and an aperture of the bracket.

\* \* \* \* \*